US012562180B2

(12) United States Patent
Kim et al.

(10) Patent No.: US 12,562,180 B2
(45) Date of Patent: Feb. 24, 2026

(54) METHOD AND APPARATUS FOR PERFORMING SPEAKER DIARIZATION BASED ON LANGUAGE IDENTIFICATION

(71) Applicant: SAMSUNG ELECTRONICS CO., LTD., Suwon-si (KR)

(72) Inventors: Myungjong Kim, Milpitas, CA (US); Vijendra Raj Apsingekar, San Jose, CA (US); Divya Neelagiri, Dublin, CA (US); Taeyeon Ki, Milpitas, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1095 days.

(21) Appl. No.: 17/538,336

(22) Filed: Nov. 30, 2021

(65) Prior Publication Data

US 2023/0169988 A1 Jun. 1, 2023

(51) Int. Cl.
| | |
|---|---|
| *G10L 25/30* | (2013.01) |
| *G06F 40/263* | (2020.01) |
| *G06N 3/045* | (2023.01) |
| *G06N 3/048* | (2023.01) |
| *G06N 20/00* | (2019.01) |
| *G10L 15/00* | (2013.01) |

(Continued)

(52) U.S. Cl.
CPC .......... *G10L 21/0272* (2013.01); *G06N 3/045* (2023.01); *G06N 3/048* (2023.01); *G06N 20/00* (2019.01); *G10L 15/005* (2013.01); *G10L 15/02* (2013.01); *G10L 15/063* (2013.01); *G10L 15/22* (2013.01); *G10L 17/02* (2013.01); *G10L 17/04* (2013.01); *G10L 17/06*

(2013.01); *G10L 17/18* (2013.01); *G10L 25/30* (2013.01); *G06F 40/263* (2020.01)

(58) Field of Classification Search
None
See application file for complete search history.

(56) References Cited

U.S. PATENT DOCUMENTS

| | | | |
|---|---|---|---|
| 10,468,031 B2 | 11/2019 | Church et al. | |
| 10,783,873 B1 * | 9/2020 | Qian ..................... | G09B 19/04 |

(Continued)

FOREIGN PATENT DOCUMENTS

| | | |
|---|---|---|
| CN | 110895932 A | 3/2020 |
| KR | 10-2020-0129934 A | 11/2020 |
| WO | 2020/199013 A1 | 10/2020 |

OTHER PUBLICATIONS

Suwon Shon, Hao Tang, James Glass; Frame-Level Speaker Embeddings For Text-Independent Speaker Recognition And Analysis Of End-To-End Model; Sep. 2018; URL: https://arxiv.org/pdf/1809.04437 (Year: 2018).*

(Continued)

*Primary Examiner* — Richa Sonifrank
(74) *Attorney, Agent, or Firm* — Sughrue Mion, PLLC

(57) ABSTRACT

An apparatus for processing speech data may include a processor configured to: separate speech signals from an input speech; identify a language of each of the speech signals that are separated from the input speech; extract speaker embeddings from the speech signals based on the language of each of the speech signals, using at least one neural network configured to receive the speech signals and output the speaker embeddings; and identify a speaker of each of the speech signals by iteratively clustering the speaker embeddings.

17 Claims, 19 Drawing Sheets

(51) Int. Cl.

| | |
|---|---|
| *G10L 15/02* | (2006.01) |
| *G10L 15/06* | (2013.01) |
| *G10L 15/16* | (2006.01) |
| *G10L 15/22* | (2006.01) |
| *G10L 17/02* | (2013.01) |
| *G10L 17/04* | (2013.01) |
| *G10L 17/06* | (2013.01) |
| *G10L 17/18* | (2013.01) |
| *G10L 21/0272* | (2013.01) |

(56) References Cited

U.S. PATENT DOCUMENTS

| | | | | |
|---|---|---|---|---|
| 10,811,000 | B2 | 10/2020 | Le Roux et al. | |
| 10,971,157 | B2 | 4/2021 | Willett et al. | |
| 11,315,545 | B2 | 4/2022 | Wintrode | |
| 12,057,102 | B2 * | 8/2024 | Shen | G06F 40/58 |
| 12,112,752 | B1 * | 10/2024 | Gupta | G10L 15/08 |
| 2014/0358541 | A1 | 12/2014 | Colibro et al. | |
| 2019/0130931 | A1 * | 5/2019 | Costa | G10L 21/10 |
| 2019/0318725 | A1 | 10/2019 | Le Roux et al. | |
| 2020/0160845 | A1 * | 5/2020 | Lavilla | G10L 15/005 |
| 2020/0226327 | A1 | 7/2020 | Matusov et al. | |
| 2020/0273449 | A1 | 8/2020 | Kumar et al. | |
| 2020/0335083 | A1 | 10/2020 | Wan et al. | |
| 2020/0379787 | A1 | 12/2020 | Martin | |
| 2021/0217411 | A1 | 7/2021 | Moreno et al. | |
| 2021/0295846 | A1 * | 9/2021 | Yang | G10L 25/30 |
| 2022/0013107 | A1 | 1/2022 | Wintrode | |
| 2022/0189496 | A1 * | 6/2022 | Takahashi | G10L 21/0272 |
| 2022/0230648 | A1 | 7/2022 | Kwon et al. | |
| 2022/0343893 | A1 | 10/2022 | Hung | |
| 2023/0169988 | A1 * | 6/2023 | Kim | G10L 15/16 |
| | | | | 704/200 |
| 2024/0347064 | A1 * | 10/2024 | Li | G06N 3/045 |
| 2025/0053273 | A1 * | 2/2025 | Uva | G06Q 30/0282 |

OTHER PUBLICATIONS

Detai Xin; Tatsuya Komatsu; Shinnosuke Takamichi; Hiroshi Saruwatari; Disentangled Speaker and Language Representations Using Mutual Information Minimization and Domain Adaptation for Cross-Lingual TTS; Jun. 2021; URL: https://ieeexplore.ieee.org/stamp/stamp.jsp?tp=&arnumber=9414226 (Year: 2021).*

International Search Report (PCT/ISA/220, PCT/ISA/210) and Written Opinion (PCT/ISA/237) issued by the International Searching Authority on Mar. 17, 2023 in corresponding International Application No. PCT/KR2022/019138.

Xiao Xiong et al., "Microsoft Speaker Diarization System for the Voxceleb Speaker Recognition Challenge 2020", ICASSP 2021-2021 IEEE International Conference on Acoustics, Speech and Signal Processing (ICASSP), Jun. 2021, pp. 5824-5828, XP033955740, DOI: 10.1109/ICASSP39728.2021.9413832.

Siqi Zheng et al., "A Real-Time Speaker Diarization System Based on Spatial Spectrum", ICASSP 2021-2021 IEEE International Conference on Acoustics, Speech and Signal Processing (ICASSP), Jun. 2021, pp. 7208-7212, XP033955173, DOI: 10.1109/ICASSP39728.2021.9413544.

Zhongxin Bai et al., "Speaker Recognition Based on Deep Learning: An Overview", Dec. 2020, arXiv:2012.00931v1 [eess.AS], 39 pages, XP081825800.

Communication issued on Oct. 22, 2024 from the European Patent Office for European Patent Application No. 22901735.5.

Communication dated Mar. 24, 2025, issued by European Patent Office in European Patent Application No. 22901735.5.

\* cited by examiner

Figure 6:
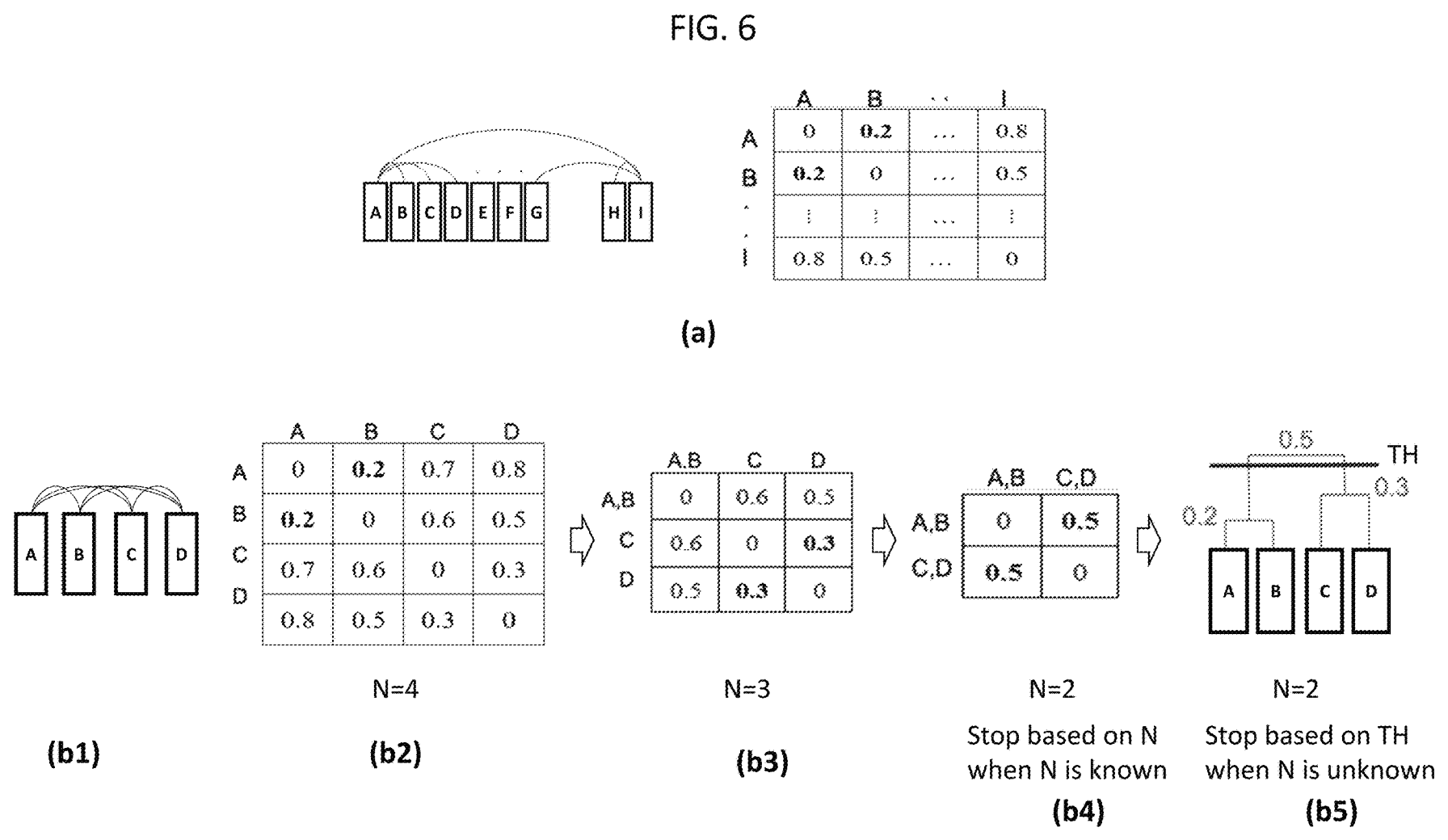

|   | A | B | ... | I |
|---|---|---|-----|---|
| A | 0 | 0.2 | ... | 0.8 |
| B | 0.2 | 0 | ... | 0.5 |
| . | ... | ... | ... | ... |
| I | 0.8 | 0.5 | ... | 0 |

(b1)

A  B  C  D (b2) N=4

|   | A | B | C | D |
|---|---|---|---|---|
| A | 0 | 0.2 | 0.7 | 0.8 |
| B | 0.2 | 0 | 0.6 | 0.5 |
| C | 0.7 | 0.6 | 0 | 0.3 |
| D | 0.8 | 0.5 | 0.3 | 0 |

(b3) N=3

|     | A,B | C | D |
|-----|-----|---|---|
| A,B | 0 | 0.6 | 0.5 |
| C | 0.6 | 0 | 0.3 |
| D | 0.5 | 0.3 | 0 |

(b4) N=2 — Stop based on N when N is known

|     | A,B | C,D |
|-----|-----|-----|
| A,B | 0 | 0.5 |
| C,D | 0.5 | 0 |

(b5) N=2 — Stop based on TH when N is unknown

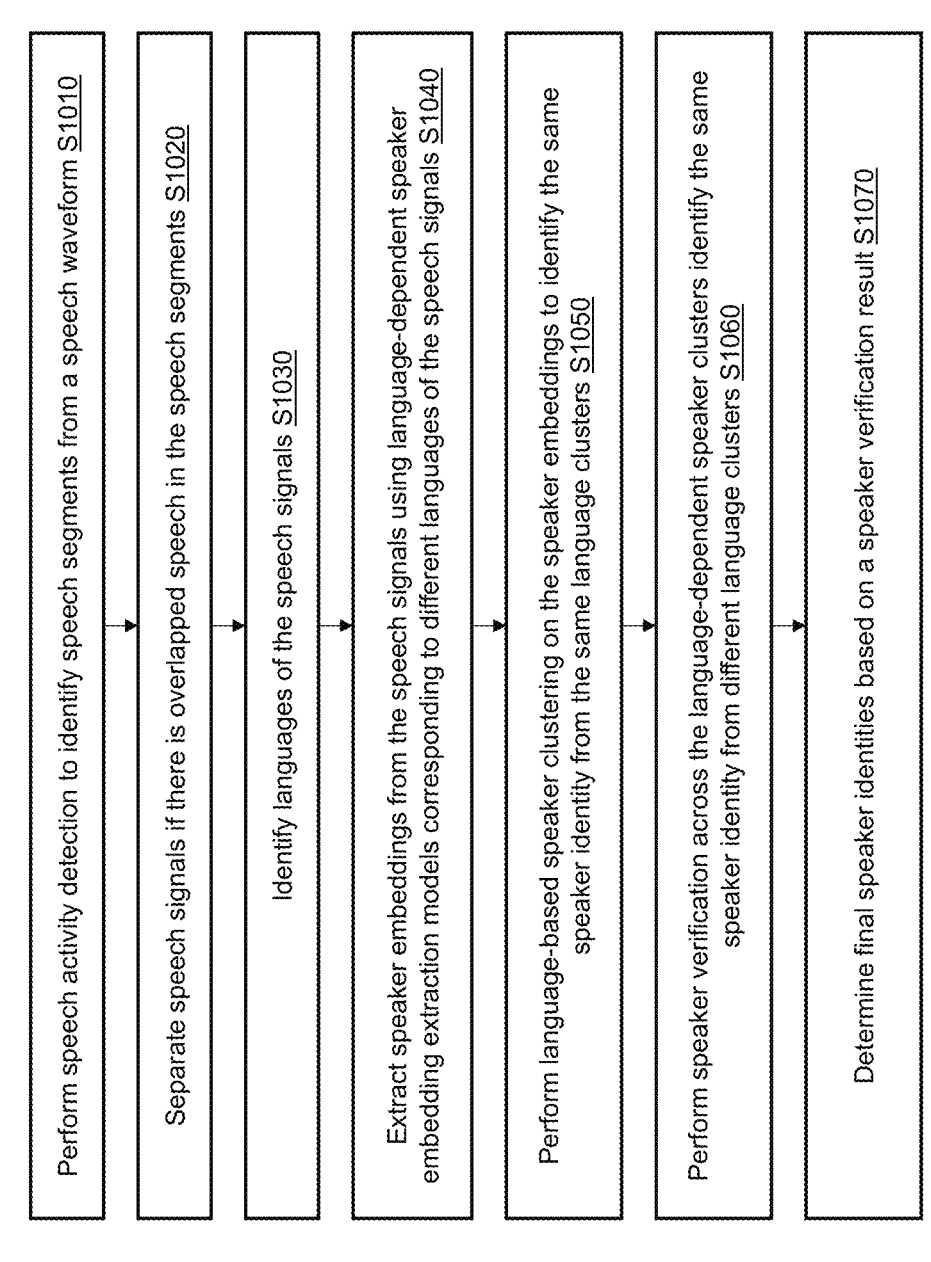

Perform speech activity detection to identify speech segments from a speech waveform S1010

Separate speech signals if there is overlapped speech in the speech segments S1020

Identify languages of the speech signals S1030

Extract speaker embeddings from the speech signals using language-dependent speaker embedding extraction models corresponding to different languages of the speech signals S1040

Perform language-based speaker clustering on the speaker embeddings to identify the same speaker identity from the same language clusters S1050

Perform speaker verification across the language-dependent speaker clusters identify the same speaker identity from different language clusters S1060

Determine final speaker identities based on a speaker verification result S1070

FIG. 11

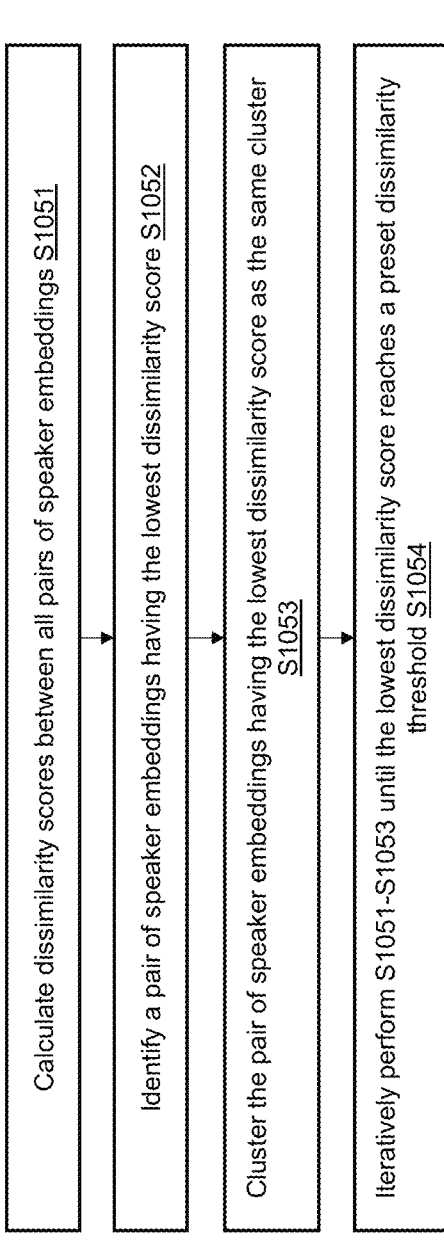

Calculate dissimilarity scores between all pairs of speaker embeddings S1051

Identify a pair of speaker embeddings having the lowest dissimilarity score S1052

Cluster the pair of speaker embeddings having the lowest dissimilarity score as the same cluster S1053

Iteratively perform S1051-S1053 until the lowest dissimilarity score reaches a preset dissimilarity threshold S1054

FIG. 13

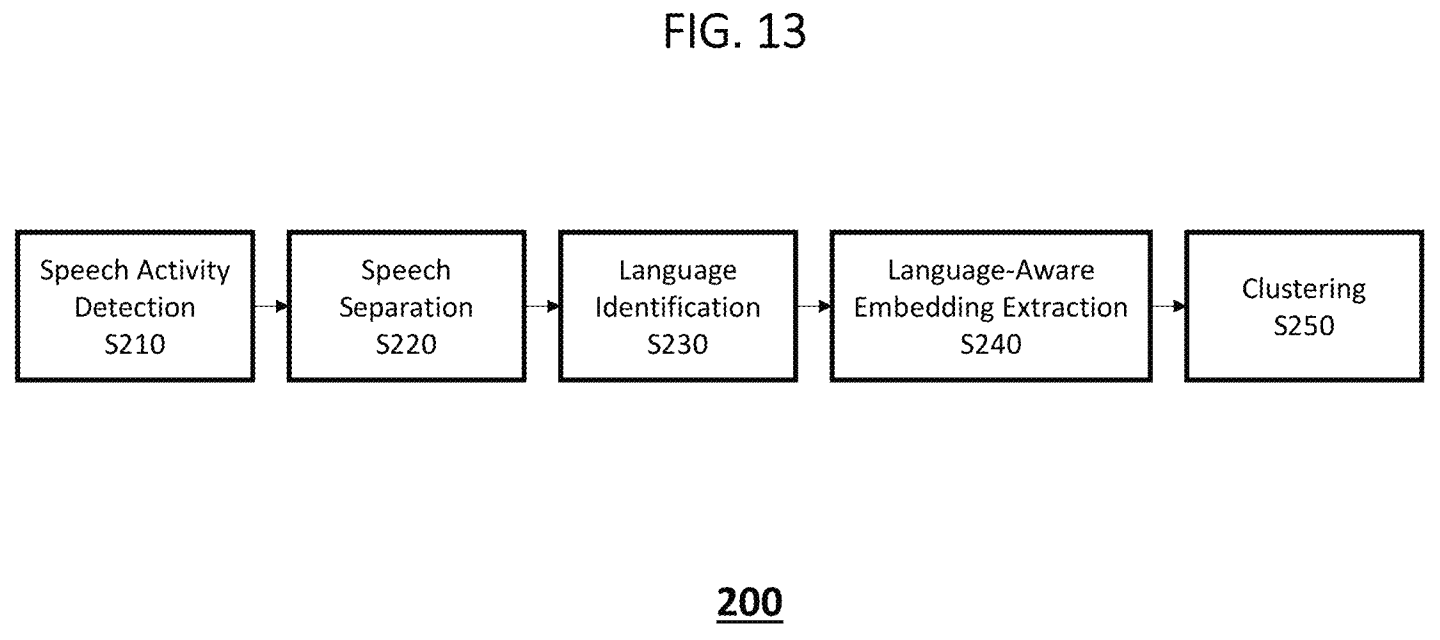

Speech Activity Detection S210 → Speech Separation S220 → Language Identification S230 → Language-Aware Embedding Extraction S240 → Clustering S250

Figure 16:
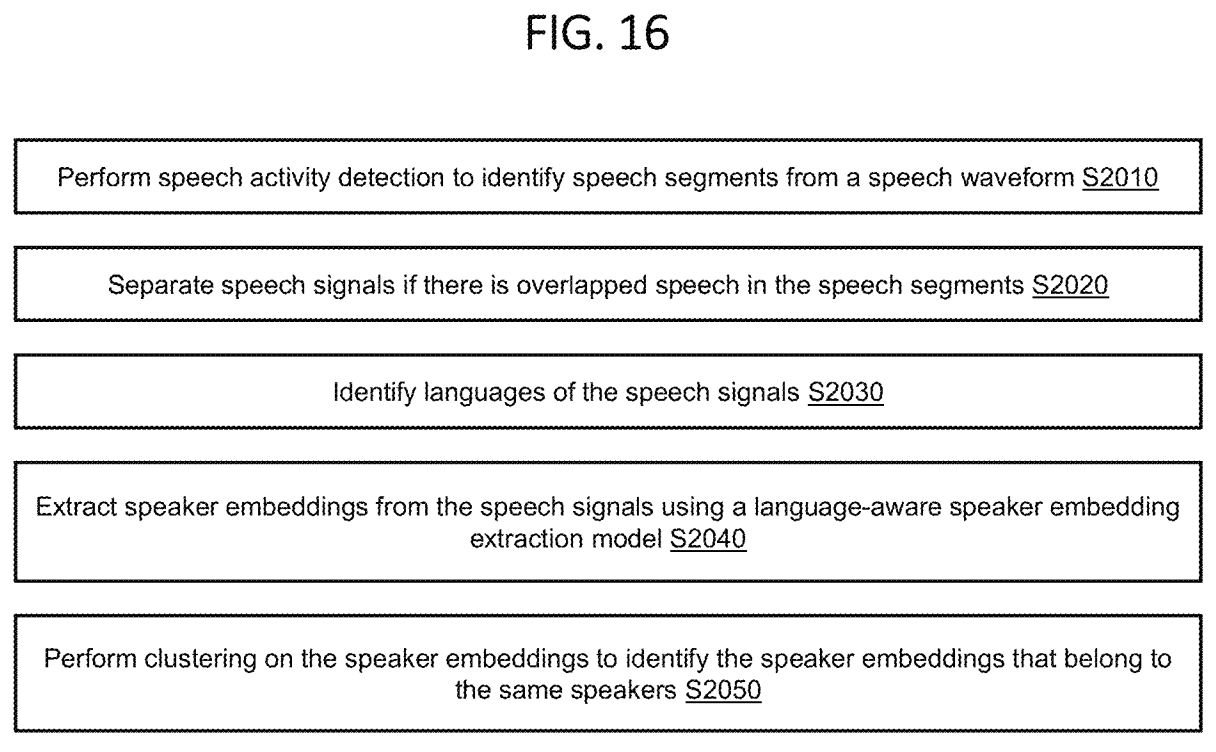

Perform speech activity detection to identify speech segments from a speech waveform S2010

Separate speech signals if there is overlapped speech in the speech segments S2020

Identify languages of the speech signals S2030

Extract speaker embeddings from the speech signals using a language-aware speaker embedding extraction model S2040

Perform clustering on the speaker embeddings to identify the speaker embeddings that belong to the same speakers S2050

FIG. 17

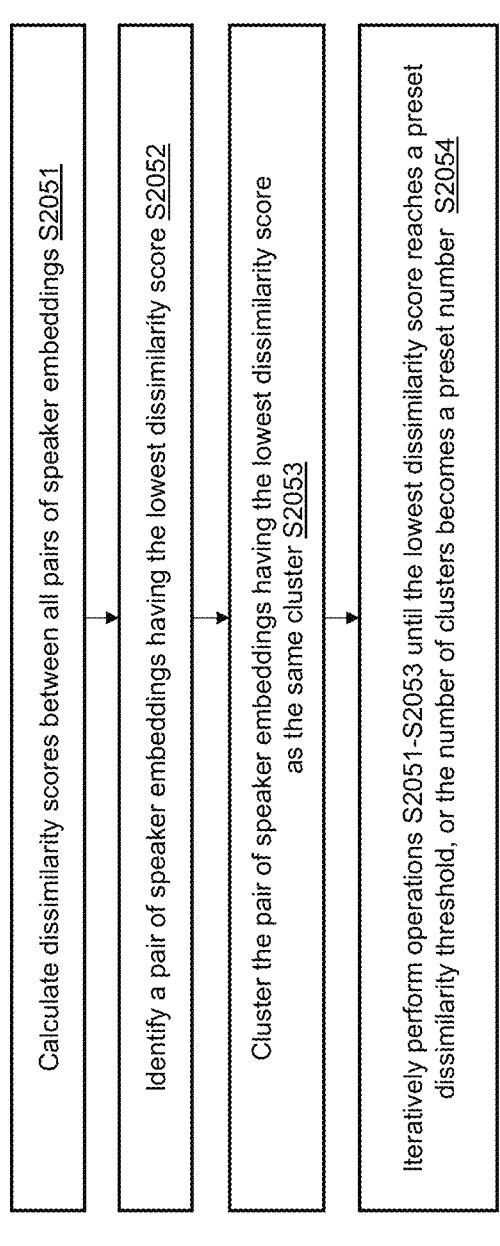

Calculate dissimilarity scores between all pairs of speaker embeddings S2051

Identify a pair of speaker embeddings having the lowest dissimilarity score S2052

Cluster the pair of speaker embeddings having the lowest dissimilarity score as the same cluster S2053

Iteratively perform operations S2051-S2053 until the lowest dissimilarity score reaches a preset dissimilarity threshold, or the number of clusters becomes a preset number S2054

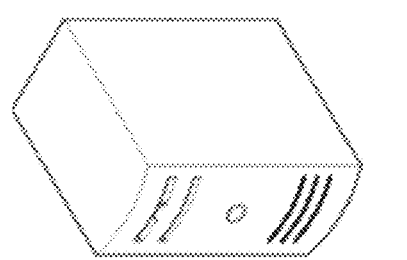
1004
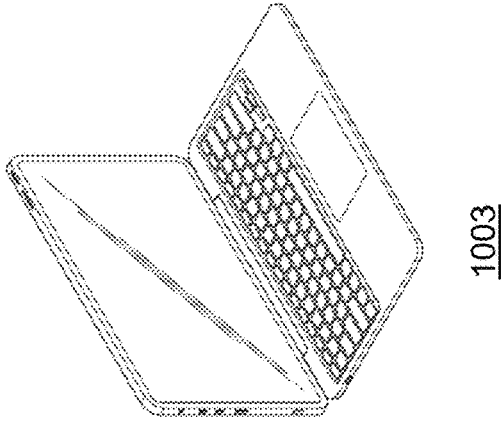
1003
FIG.18
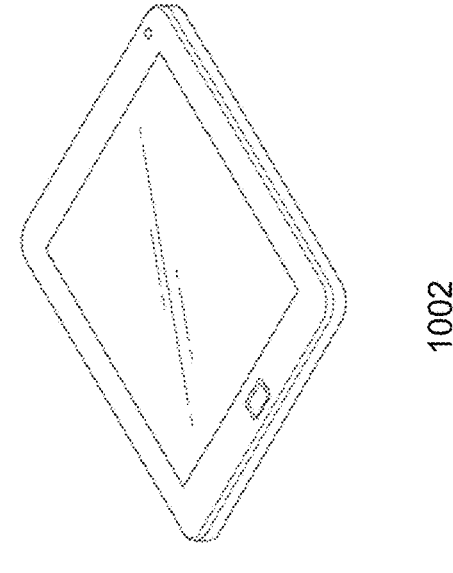
1002
1001

METHOD AND APPARATUS FOR PERFORMING SPEAKER DIARIZATION BASED ON LANGUAGE IDENTIFICATION

BACKGROUND

1. Field

The disclosure relates to a method and an apparatus for identifying different speakers in an audio stream, and particularly identifying multilingual speakers who speak multiple languages in the audio stream, and analyzing the audio stream according to identifications of the speakers.

2. Description of Related Art

Speaker diarization is the process of labeling different speakers in an audio stream, responding to the question "who spoke when" in a multi-speaker conversation, or determining that only one speaker is present. Speaker diarization has potential in a variety of applications such as meeting conversation analysis and multimedia information retrieval. For meeting conversation analysis, for example, speaker diarization may be used as a front-end component of automatic speech recognition (ASR), providing improved ASR accuracy and rich analysis depending on participants.

In a single language-based speaker diarization model, a speech recording may be processed using a general speaker embedding extraction model regardless of the language of the speech. Therefore, accuracy of speech diarization may decrease especially when the same speaker makes utterances in different languages since the general speaker embedding extraction model may not be able to recognize that the utterances in different languages are given by the same speaker due to different acoustic characteristics of the different languages.

SUMMARY

In accordance with an aspect of the disclosure, there is provided an apparatus for processing speech data, including: a memory storing instructions; and a processor configured to execute the instructions to: separate speech signals from an input speech; identify a language of each of the speech signals that are separated from the input speech; extract speaker embeddings from the speech signals based on the language of each of the speech signals, using at least one neural network configured to receive the speech signals and output the speaker embeddings; and identify a speaker of each of the speech signals by iteratively clustering the speaker embeddings.

The processor may be further configured to execute the instructions to: identify the speaker of each of the speech signals based on a vector dissimilarity between a plurality of pairs of the speaker embeddings until the vector dissimilarity becomes a predetermined threshold or a number of clusters becomes a predetermined number.

The processor may be further configured to execute the instructions to: obtain the speaker embeddings from each of a plurality of different speech embedding extraction models by inputting the speech signals in different languages to the plurality of different speech embedding extraction models, wherein the at least one neural network of each of the plurality of different speech embedding extraction models may be trained with the different languages; cluster the speaker embeddings for each of the different languages separately, to obtain language-dependent embedding clusters for each of the different languages; and combine the language-dependent embedding clusters based on a vector dissimilarity between a plurality of pairs of the language-dependent clusters, to obtain cross-language embedding clusters.

The different languages may include a first language and a second language, and the plurality of different speech embedding extraction models may include a first neural network model trained based on the first language, and a second neural network model trained based on the second language. The processor may be further configured to: obtain the speaker embeddings corresponding to the first language, and the speaker embeddings corresponding to the second language, from the first neural network model and the second neural network model, respectively; iteratively cluster the speaker embeddings corresponding to the first language, and the speaker embeddings corresponding to the second language, separately, to obtain first-language clusters and second-language clusters, respectively; and combine the first-language clusters and the second-language clusters based on the vector dissimilarity between a plurality of pairs of the first-language clusters and the second-language clusters, to obtain the cross-language embedding clusters.

Each of the plurality of different speech embedding extraction models may include: a plurality of frame-level layers configured to process the speech signals at a frame-level, to provide frame-level representations of the speech signals; a pooling layer configured to aggregate the frame-level representations over a segment, based on a deviation of the frame-level representations; a plurality of segment-level layers configured to process the frame-level representations at a segmentation level to provide segmentation-level representations of the speech signals and the speaker embeddings; and an output layer configured to output a speaker identification of each of the segmentation-level representations of the speech signals.

The plurality of frame-level layers may form a convolutional neural network or a time-delayed neural network.

The speaker embeddings may be output from a last hidden layer of the plurality of segment-level layers that immediately precedes the output layer.

The output layer may use a softmax activation function.

The processor may be further configured to execute the instructions to: extract the speaker embeddings from the speech signals, using the at least one neural network that is further configured to receive language information corresponding to the speaker embedding.

The identified language of each of the speech signals may include a first language and a second language, wherein the processor may be further configured to execute the instructions to: while extracting the speaker embeddings from the speech signals, input information of the first language to the at least one neural network when the speech signals in the first language are input to the at least one neural network, and input information of the second language to the at least one neural network when the speech signals in the second language are input to the at least one neural network.

The at least one neural network may include: a plurality of frame-level layers configured to process the speech signals at a frame-level, to provide frame-level representations of the speech signals; a pooling layer configured to aggregate the frame-level representations over a segment, based on a deviation of the frame-level representations; a plurality of segment-level layers configured to process the frame-level representations at a segmentation level to provide segmentation-level representations of the speech signals and the speaker embeddings; and an output layer configured to output a speaker identification of each of the segmentation-level representations of the speech signals, wherein the language information may be input to one of the plurality of frame-level layers, and to the plurality of segment-level layers.

In accordance with an aspect of the disclosure, there is provided a method of processing speech data, including: separating speech signals from an input speech; identifying a language of each of the speech signals that are separated from the input speech; extracting speaker embeddings from the speech signals based on the language of each of the speech signals, using at least one neural network configured to receive the speech signals and output the speaker embeddings; and identifying a speaker of each of the speech signals by iteratively clustering the speaker embeddings.

The identifying the speaker of each of the speech signals may include: identifying the speaker of each of the speech signals by iteratively clustering the speaker embeddings based on a vector dissimilarity between a plurality of pairs of the speaker embeddings until the vector dissimilarity becomes a predetermined threshold or a number of clusters becomes a predetermined number.

The extracting the speaker embeddings may include: obtaining the speaker embeddings from each of a plurality of different speech embedding extraction models by inputting the speech signals in different languages to the plurality of different speech embedding extraction models, wherein the at least one neural network of each of the plurality of different speech embedding extraction models is trained with the different languages; clustering the speaker embeddings for each of the different languages separately, to obtain language-dependent embedding clusters for each of the different languages; and combining the language-dependent embedding clusters based on a vector dissimilarity between a plurality of pairs of the language-dependent clusters, to obtain cross-language embedding clusters.

The different languages may include a first language and a second language, and the plurality of different speech embedding extraction models may include a first neural network model trained based on the first language, and a second neural network model trained based on the second language. The extracting the speaker embeddings may further include: obtaining the speaker embeddings corresponding to the first language, and the speaker embeddings corresponding to the second language, from the first neural network model and the second neural network model, respectively; iteratively clustering the speaker embeddings corresponding to the first language, and the speaker embeddings corresponding to the second language, separately, to obtain first-language clusters and second-language clusters, respectively; and combining the first-language clusters and the second-language clusters based on the vector dissimilarity between a plurality of pairs of the first-language clusters and the second-language clusters, obtain the cross-language embedding clusters.

The extracting the speaker embeddings may include: obtaining frame-level representations from the speech signals at a frame-level; aggregating the frame-level representations over a segment, based on a deviation of the frame-level representations; processing the aggregated frame-level representations at a segmentation level to provide segmentation-level representations of the speech signals and the speaker embeddings; and outputting the speaker embeddings, and a speaker identification of each of the segmentation-level representations of the speech signals.

The extracting the speaker embeddings may include: extracting the speaker embeddings from the speech signals, using the at least one neural network that is further configured to receive language information corresponding to the speaker embedding.

The at least one neural network may include a plurality of frame-level layers, a pooling layer, a plurality of segment-level layers, and an output layer. The extracting the speaker embeddings may include: inputting information of the identified language to one of the plurality of frame-level layers, and to the plurality of segment-level layers; and obtaining the speaker embeddings from a last hidden layer of the plurality of segment-level layers that immediately precedes the output layer.

The identified language may include a first language and a second language. The extracting the speaker embeddings may include: while extracting the speaker embeddings from the speech signals, inputting information of the first language to the at least one neural network when the speech signals in the first language are input to the at least one neural network, and inputting information of the second language to the at least one neural network when the speech signals in the second language are input to the at least one neural network.

The identifying the speaker of each of the speech signals may include: performing language-dependent speaker clustering on the speaker embeddings of multiple languages to cluster the speaker embeddings per language as language-dependent clusters; performing cross-language speaker clustering on the language-dependent clusters to identify the speaker in the language-dependent clusters of the multiple languages; merging the language-dependent clusters of the multiple languages that belong to the same speaker, to obtain final speaker clusters; and identifying the final speaker clusters as final speaker identities of the speech signals.

In accordance with an aspect of the disclosure, there is provided a non-transitory computer-readable storage medium storing a program that is executable by a computer to perform a method of processing speech data, the method including: separating speech signals from an input speech; identifying a language of each of the speech signals that are separated from the input speech; extracting speaker embeddings from the speech signals based on the language of each of the speech signals, using at least one neural network configured to receive the speech signals and output the speaker embeddings; and identifying a speaker of each of the speech signals by iteratively clustering the speaker embeddings.

BRIEF DESCRIPTION OF THE DRAWINGS

The above and other aspects, features, and advantages of embodiments of the disclosure will be more apparent from the following description taken in conjunction with the accompanying drawings, in which:

FIG. 2 is a diagram illustrating a speech separation process according to embodiments;

FIG. 4 is a diagram illustrating a language identification process according to embodiments;

FIG. 6 is a diagram illustrating a clustering process according to embodiments;

FIG. 8 is a diagram of devices for performing speaker diarization according to embodiments;

FIGS. 10-12 are flowcharts illustrating a method of performing speaker diarization according to embodiments;

FIG. 13 illustrates a method of performing speaker diarization based on language identification, according to other embodiments of the disclosure;

FIG. 14 illustrates an overall speaker diarization process according to other embodiments;

FIGS. 16 and 17 are flowcharts illustrating a method of performing speaker diarization according to embodiments; and FIG. 18 are views illustrating examples of an electronic apparatus performing speaker diarization according to various embodiments of the disclosure.

DETAILED DESCRIPTION

Embodiments described herein provide a method and an apparatus for identifying different speakers in an audio stream, and particularly identifying multilingual speakers who speak multiple languages in an audio stream, and analyzing the audio stream according to identifications of the speakers.

Example embodiments are described in greater detail below with reference to the accompanying drawings.

Figure 1:
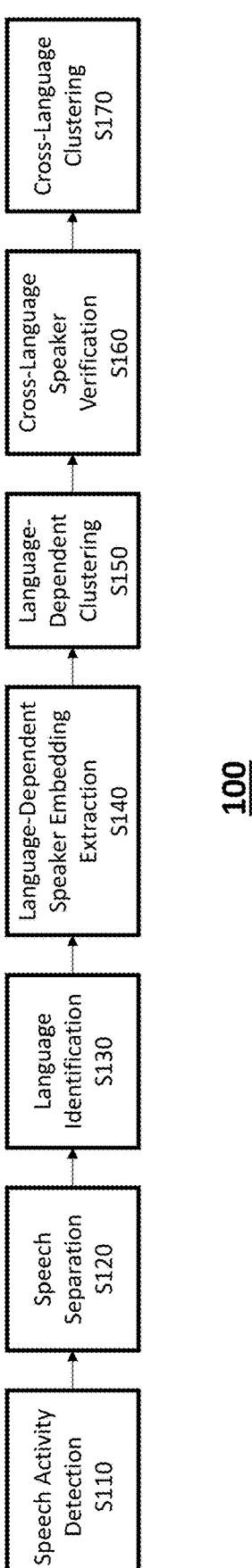
FIG. 1 is a diagram illustrating a method of performing speaker diarization based on language identification according to embodiments of the present disclosure.

FIG. 1 is a diagram illustrating a method 100 of performing speaker diarization based on language identification according to embodiments of the present disclosure. Operations S110-S170 illustrated in FIG. 1 may be performed by at least one processor included in any type of electronic device, for example, a smartphone, a laptop computer, a personal computer (PC), a smart television, a server, and the like.

As shown in FIG. 1, the method 100 includes operation S110 of detecting speech activities from an audio stream, operation S120 of separating overlapped speech signals from the audio stream, operation S130 of identifying a language corresponding to each of the speech signals, operation S140 of extracting speaker embeddings from the speech signals based on a language identification of each of the speech signals, operation S150 of clustering the speaker embeddings corresponding to the same languages and the same speaker identities, as language-dependent speaker clusters, operation S160 of performing a cross-language speaker verification on the language-dependent speaker clusters to determine if there is the same speaker in the language-dependent speaker clusters of different languages, and operation S170 of combining the language-dependent speaker clusters based on a result of the cross-language speaker verification, to obtain cross-language speaker clusters that correspond to multiple speakers in the audio stream, respectively. Final speaker identifications (IDs) may be assigned to the cross-language speaker clusters, and the number of the final speakers IDs may match the number of speakers in the audio stream.

The speaker identities determined by the speaker clusters may be used to identify the speaker of a speech segment corresponding to the speech signal, for example to present the identity of a speaker to a user accessing the speech segment. This identification may be in real-time or stored in memory and presented on demand when the speech segment is accessed. The speaker identifications may be indicated in any suitable manner, such as graphical indication of a speaker of an audio speech segment or an annotation of a transcript corresponding to the speech segment.

Specifically, in operation S110, the method S100 includes performing speech activity detection (SAD) to automatically identify speech signals (each of which includes speech segments) from an input audio signal, for example, based on a Gaussian mixture model, a hidden Markov model, or a multi-layer perceptron model. The SAD is applied to the input audio signal to filter out non-speech frames and to divide the detected speech signals into short-time windowed speech segments (e.g., 1.5 second segments).

In operation S120, the method S100 includes applying speech separation to the speech segments of the speech signals, to separate the speech signals if the speech signals are overlapped with each other in a time domain. Operation S120 will be further described later with reference to FIGS. 2, 3A and 3B.

In operation S130, a language of each of the speech segments is identified, for example, using a neural network-based language identification model. The structure and the operation of the neural network-based language identification model will be described later with reference to FIG. 4.

In operation S140, speaker embeddings are extracted from the speech segments using speaker embedding extraction models that correspond to different languages of the speech segments. For example, when a speech segment is identified as an English speech, the speech segment is input to an English speaker embedding extraction model, and when the speech segment is identified as a Korean speech, the speech segment is input to a Korean speaker embedding extraction model, among a plurality of different language-dependent speaker embedding extraction models. The language-dependent speaker embedding extraction models may include one or more neural networks. The structure and the operation of the language-dependent speaker embedding extraction models will be described later with reference to FIG. 5.

In operation S150, the speaker embeddings are clustered per language, to determine speech segments that belong to the same speaker identities per language and thereby to obtain language-dependent speaker clusters. For example, clustering of the speaker embeddings corresponding to a first language (e.g., English), is performed separately from clustering of the speaker embeddings corresponding to a second language (e.g., Korean). For the first language, the speaker embeddings corresponding to the same speaker identities are clustered together. Also, for the second language, the speaker embeddings corresponding to the same speaker identities are clustered together.

In one embodiment, a vector similarity (or a vector dissimilarity) is determined between each pair of speaker embeddings, which may be represented in a score matrix. A hierarchical clustering algorithm may be applied to the score matrix to collapse pairs of speaker embeddings into clusters by combining pairs of speaker embeddings and/or clusters that have the highest vector similarity (or the lowest vector dissimilarity) between each other. This algorithm is performed iteratively until no speaker embeddings or clusters of speaker embeddings have a sufficiently high similarity (a sufficiently low dissimilarity) to justify further collapsing them into larger clusters, or until the number of clusters reaches a preset number. The result is one or more clusters of speaker embeddings, where speaker embeddings in each cluster have higher similarities (or lower dissimilarities)

with each other than with vector similarities (or vector dissimilarities) between speaker embeddings that are not in the cluster. A clustering process will be further described later with reference to FIG. 6.

In operation S160, speaker verification is performed between language-dependent speaker clusters to determine if there are speeches spoken by the same speaker in the language-dependent speaker clusters of different languages.

For example, when there are five language-dependent speaker clusters, including first language-based speaker clusters, A1 and A2, and second language-based speaker clusters, B1, B2, and B3, a vector similarity (e.g., a cosine similarity) or a vector dissimilarity (e.g., a cosine dissimilarity) between a plurality of pairs of the first language-based speaker clusters, A1 and A2, and the second language-based speaker clusters, B1, B2, and B, may be computed, as follows:

A first vector dissimilarity between the speaker embedding of the first language-based speaker cluster A1 and the speaker embedding of the second language-based speaker cluster B1;

A second vector dissimilarity between the speaker embedding of the first language-based speaker cluster A1 and the speaker embedding of the second language-based speaker cluster B2;

A third vector dissimilarity between the speaker embedding of the first language-based speaker cluster A1 and the speaker embedding of the second language-based speaker cluster B3;

A fourth vector dissimilarity between the speaker embedding of the first language-based speaker cluster A2 and the speaker embedding of the second language-based speaker cluster B1;

A fifth vector dissimilarity between the speaker embedding of the first language-based speaker cluster A2 and the speaker embedding of the second language-based speaker cluster B2; and A sixth vector dissimilarity between the speaker embedding of the first language-based speaker cluster A2 and the speaker embedding of the second language-based speaker cluster B3.

In computing the first to the sixth vector dissimilarities, the speaker embedding of each of the language-dependent speaker clusters may be obtained by averaging vector values of the speaker embeddings belonging to the same language-based speaker clusters. In an embodiment of the disclosure, two speaker embeddings may be input to a neural network that is trained to output a dissimilarity score between the two speaker embeddings, and thereby to determine whether the two speaker embeddings are from the same speaker or not.

Once the vector dissimilarities are obtained as dissimilarity scores, the dissimilarity scores are compared with a predetermined dissimilarity threshold, and two clusters having a dissimilarity score that is less than the predetermined dissimilarity threshold are combined as the same cluster, when the number of speakers in the audio stream is unknown. When the number of speakers in the audio stream is known, a clustering algorithm is applied to identify a pair of speaker clusters having a dissimilarity score that is less than the predetermined dissimilarity threshold, combine them as the same cluster, and then increase the predetermined dissimilarity threshold to iteratively perform the clustering algorithm until the total number of clusters becomes the number of speakers. For example, when the second vector dissimilarity between the speaker embedding of the first language-based speaker cluster A1 and the speaker embedding of the second language-based speaker cluster B2 is less than the predetermined dissimilarity threshold, the first language-based speaker cluster A1 and the speaker embedding of the second language-based speaker cluster B2 are clustered as the same cluster (e.g., cluster no. 1). When the number of speakers in the audio stream is known, the clustering is iteratively performed by iteratively increasing the predetermined dissimilarity threshold until the number of clusters becomes equal to the number of speakers. For example, when it is known that there are four (4) speakers in the audio stream, the clustering stops when the first language-based speaker cluster A1 and the second language-based speaker cluster B2 are clustered into the same cluster, and therefore the total number of clusters becomes four (4). Every time when two clusters are combined as the same cluster but the total number of clusters is greater than the number of speakers, the predetermined dissimilarity threshold is increased and operation S160 is iteratively performed based on the increased dissimilarity threshold In an embodiment of the disclosure, when the number of speakers is not known, the language-dependent clustering of operation S150 is performed based on a first threshold, and the cross-language speaker verification of operation 160 is performed based on a second threshold to compare a dissimilarity score of (any) two different language clusters with the second threshold, and to combine the two different language clusters having a dissimilarity score that is less than the second threshold, as the same cluster. The second threshold may be the same as or different from the first threshold.

On the other hand, when the number of speakers is known, clustering is performed based on information of the number of speakers as well as an adaptively adjusted threshold in an iterative way. When the number of speakers is known, the language-dependent clustering of operation S150 is iteratively performed until the number of clusters become the number of speakers or the lowest dissimilarity score reaches a first threshold, and the cross-language speaker verification of operation 160 includes comparing a dissimilarity score of (any) two different language clusters with a second threshold, and combining the two different language clusters having a dissimilarity score that is less than the second threshold, as the same cluster, until the total number of clusters becomes equal to the number of speaker. After each clustering step in operation 160, the second threshold is increased (by a preset value) and operation S160 is iteratively performed based on the increased second threshold until the total number of clusters reaches the number of speakers. In other words, the second threshold is iteratively increased until the total number of clusters becomes equal to the number of speakers. The second threshold may be the same as or different from the first threshold.

In operation 170, the language-dependent speaker clusters are merged based on final speaker identifications assigned to each of the language-dependent speaker clusters. For example, when the clustering stops after the first language-based speaker cluster A1 and the second language-based speaker cluster B2 are clustered into the same cluster, final speaker identification nos. 1-4 are assigned to cluster {A1 and B2}, cluster {A2}, cluster {B1}, and cluster {B3}, respectively.

Figure 2:
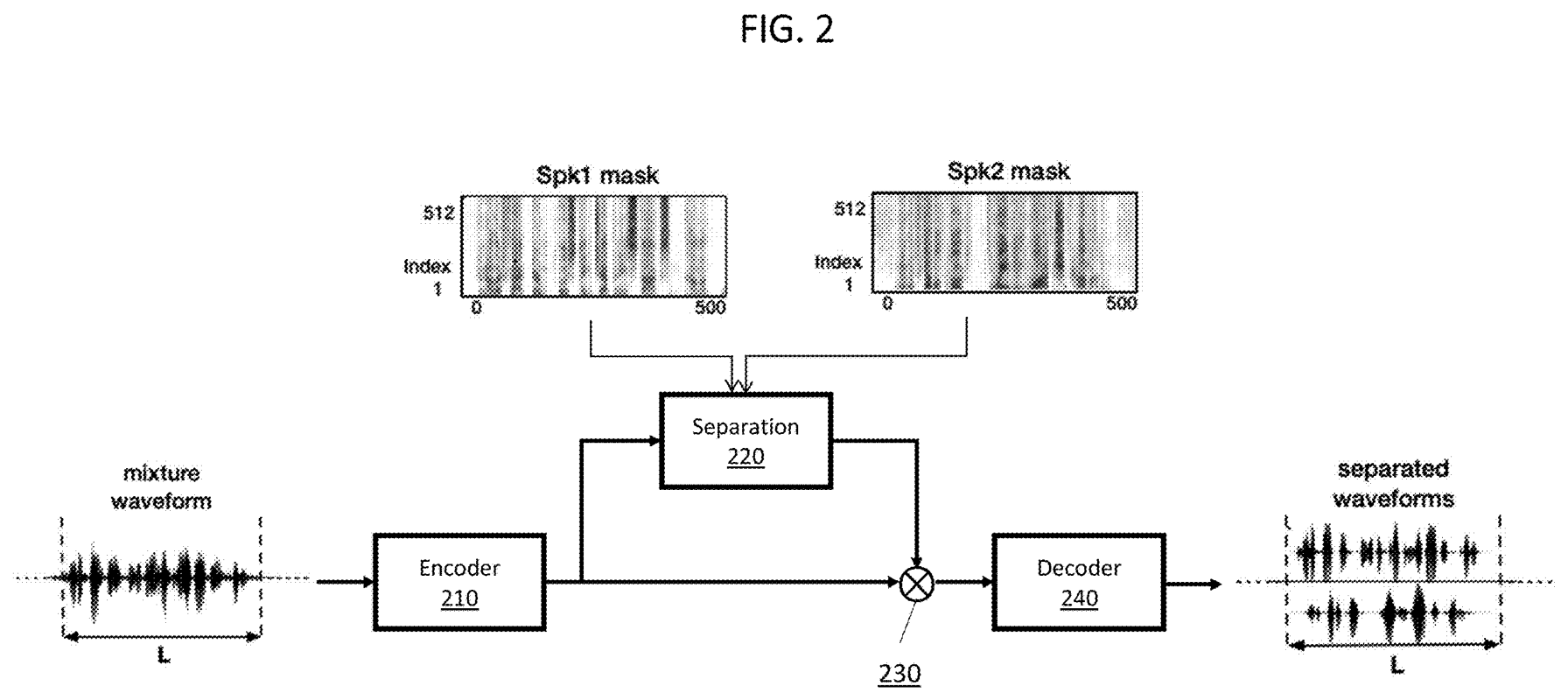

FIG. 2 is a diagram illustrating a method of performing speech separation according to an embodiment.

In an embodiment of the disclosure, a deep learning-based speech separation model may be used to separate overlapped speech signals.

As shown in FIG. 2, the deep learning-based speech separation model may include an encoder 210, a separation module 220, a multiplier 230, and a decoder 240.

The encoder 210 may receive a speech segment of a length L, in which two speech signals Spk1 and Spk2 are overlapped.

The encoder 210 may map the speech segment to a high-dimensional representation via a convolutional operation. For example, the encoder 210 may include a 1×1 convolutional layer, followed by a nonlinear activation function layer, a normalization layer, and a depth-wise convolutional layer, to output the high-dimensional representation of the speech segment.

The separation module 220 may compute a multiplicative function (i.e., a mask) for each target source (e.g., each of the two speech signals Spk1 and Spk2), based on an output from the encoder 210. For example, the separation module 220 may use a temporal convolutional network (TCN) or a fully convolutional neural network including stacked 1-D convolutional layers, to estimate a mask (e.g., Spk1 mask and Spk 2 mask) for each of the speech signals Spk1 and Spk2.

The multiplier 230 may multiply the output of the encoder 210 by the Spk1 mask and the Spk 2 mask, in sequence or in parallel, to obtain a first masked feature and a second masked feature, respectively.

The decoder 240 may reconstruct speech signals Spk1 and Spk2 from the first masked feature and the second masked feature, for example, using a one-dimensional (1-D) transposed convolution operation. As a result, speech signals Spk1 and Spk2 are separated from the speech segment.

The separation process in FIG. 2 shows that two speech signals are separated from a mixture waveform, but the number of separable speech signals is not limited thereto, and more than two speech signals may be separated via the speech separation process according to the embodiment of the present application.

Figure 3A:
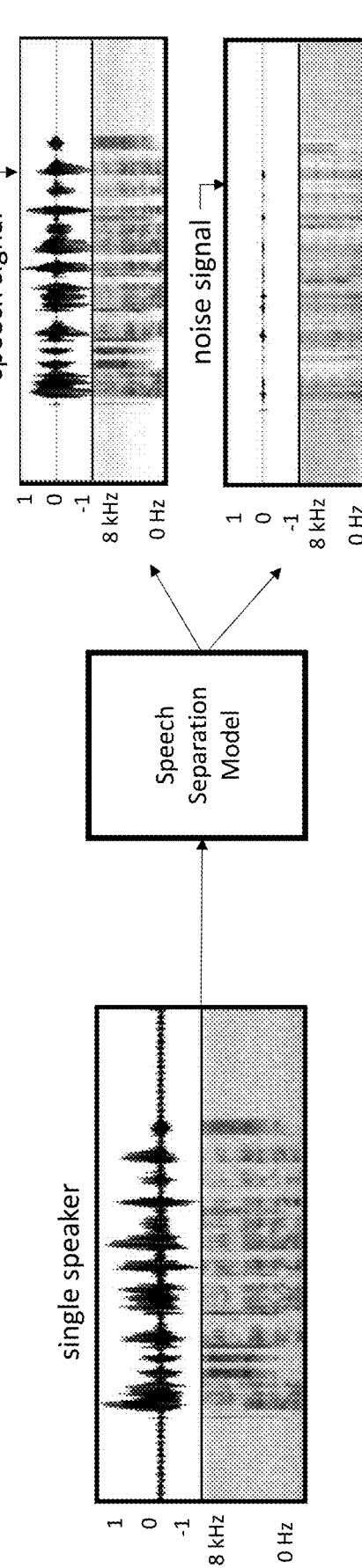
FIGS. 3A and 3B illustrate examples of speech separation according to embodiments.
Figure 3B:
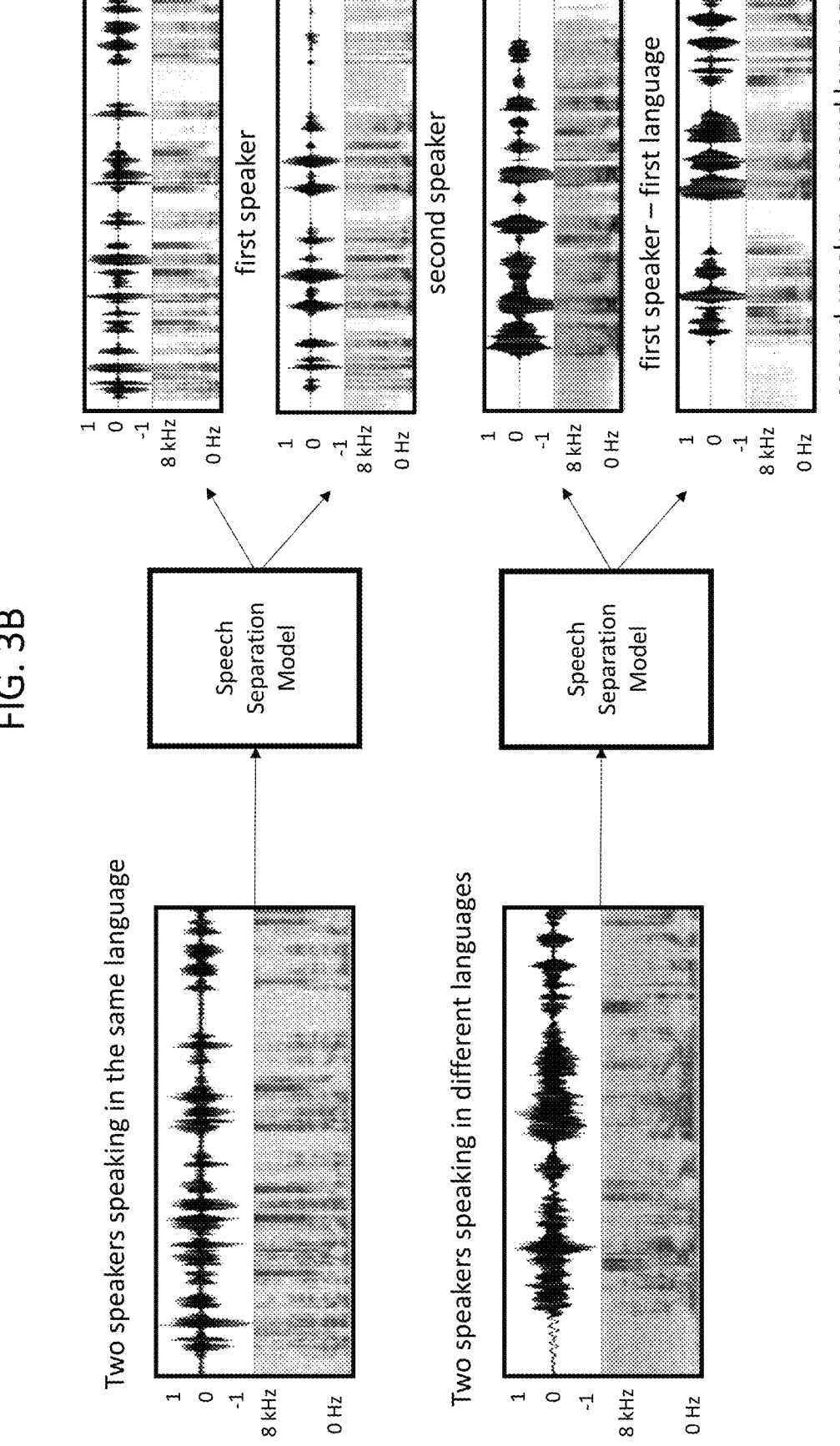

FIGS. 3A and 3B illustrate examples of speech separation according to an embodiment.

As shown in FIG. 3A, when a single speaker is presented in a speech segment, a speech separation model according to an embodiment may separate two signals from the speech segment, which have different energy levels. An average energy level of each of the two signals may be measured and compared with each other to identify a speech signal and a noise signal, between the two signals.

In an embodiment, an energy-based function may be applied to a first output signal and a second output signal of the speech separation model, to filter out a noise signal. For example, the first output signal is identified as a noise signal and is filtered out when the following first condition is satisfied, and the second output signal is identified as a noise signal and is filtered out when the following second condition is satisfied:

first condition: an average energy of the first output signal<$\lambda$×an average energy of second output signal;

second condition: an average energy of the second output signal<$\lambda$×an average energy of first output signal, where $\lambda$ is a pre-set weight (e.g. 0.2).

In the embodiment, the noise signal is filtered out and only the speech signal may be used for further signal processing.

As shown in FIG. 3B, a speech separation model according to an embodiment of the present disclose is capable of separating two overlapped speech signals of different languages as well as separating two overlapped speech signals of the same language.

For example, when two speakers speak in the same language at the same time, the overlapped speech is separated into a first speech signal corresponding to a first speaker, and a second speech signal corresponding to a second speaker. When two speakers speak in different languages at the same time, the overlapped speech is separated into a first speech of a first language corresponding to a first speaker, and a second speech of a second language corresponding to a second speaker.

The speech separation model shown in FIGS. 3A and 3B may be implemented by the encoder 210, the separation model 220, the multiplier 230, and the decoder 240 in FIG. 2.

Figure 4:
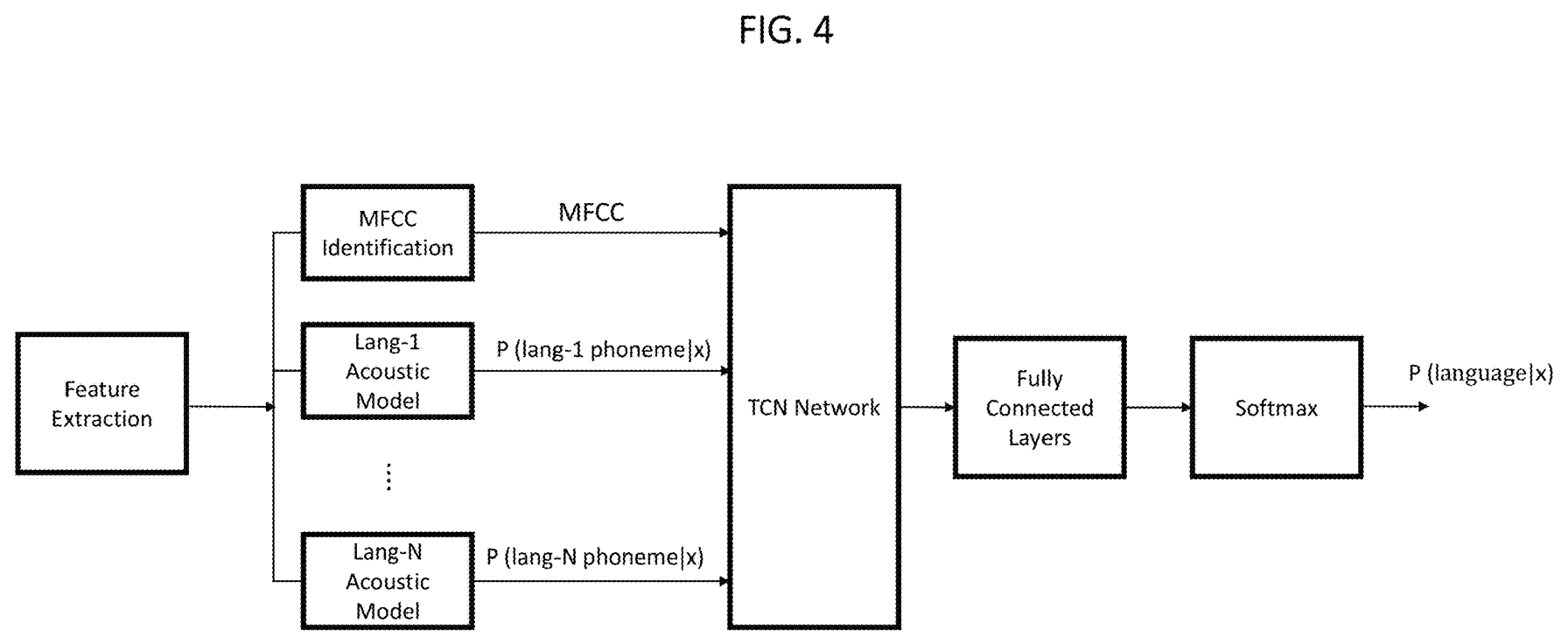

FIG. 4 is a diagram illustrating a method of performing language identification according to an embodiment.

In an embodiment of the disclosure, a temporal convolutional neural network (TCNN)-based language identification model may be used to identify a spoken language.

Once a speech signal is obtained in operations S110 and S120, acoustic features may be extracted from the speech signal. The acoustic features are combined to obtain a concatenation of acoustic features (MFCC). Also, the acoustic features are input to a plurality of acoustic models corresponding to different languages, a first language-based acoustic model, a second language-based acoustic model, and an N-th language-based acoustic model, to output phoneme posterior probabilities including a first phoneme posterior probability P(lang-1 phoneme|x) indicating the probability that the phoneme is in a first language, a second phoneme posterior probability P(lang-2 phoneme|x) indicating the probability that the phoneme is in a second language, and an N-th phoneme posterior probability P(lang-N phoneme|x) indicating the probability that the phoneme is in a third language.

The MFCC, the first phoneme posterior probability, second phoneme posterior probability, and the N-th phoneme posterior probability are fed, as input, into a temporal convolutional neural network (TCNN), followed by fully connected layers and a softmax layer, to obtain a language identification result P (language|x) as an output of the TCNN-based language identification model.

Figure 5:
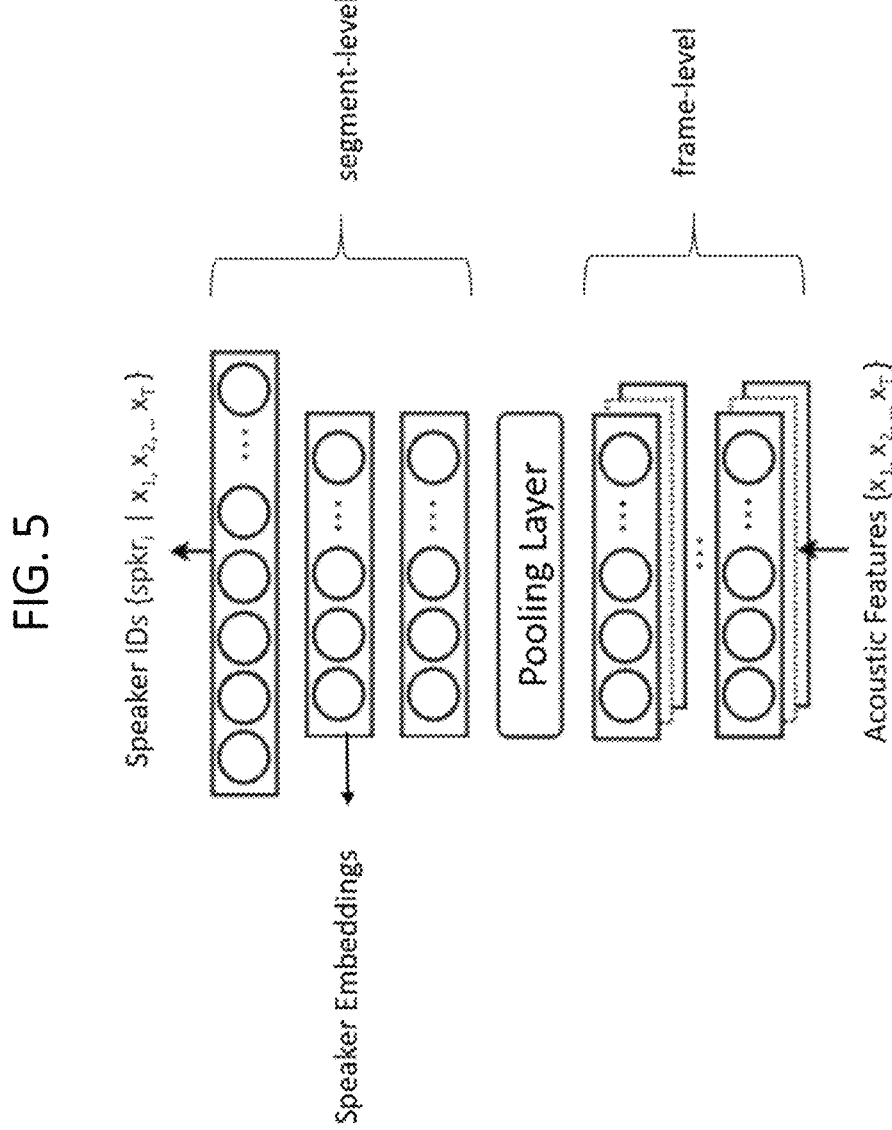
FIG. 5 is a diagram illustrating a speaker embedding extraction process according to embodiments.

FIG. 5 is a diagram illustrating a method of performing a speaker embedding extraction according to an embodiment.

In an embodiment of the disclosure, a deep learning based speaker embedding extraction model may be employed to extract speaker embeddings from speech signals.

As shown in FIG. 5, a speaker embedding extraction model includes one or more neural networks. For example, the speaker embedding extraction model according to an embodiment includes frame-level layers, a statistics pooling layer, and segment-level layers.

The frame-level feature layers receive, as input, frame-level acoustic features (e.g., features extracted from 10 ms time windowed frames), for example such as Mel-filter bank energies, Mel-frequency cepstral coefficients, and the like. The input is represented as $x_1, x_2, \ldots x_T$, wherein T is the number of frames. For example, when the length of the input speech signal is 1.5 seconds, the speech signal is split into 150 frames, each having the length of 10 ms. The acoustic features extracted from 150 frames, $x_1, x_2, \ldots, x_{150}$, may be input to a first layer (i.e., an input layer) of the frame-level feature layers, as the frame-level acoustic features.

The frame-level feature layers may be constituted with a deep neural network such as a convolutional neural network or time-delayed neural network, and may output frame-level activations, $f_1, f_2, \ldots f_n$.

The statistics pooling layer may aggregate the frame-level activations $f_2, \ldots f_n$ over a segment (e.g., 1.5 seconds). For example, the statistics pooling layer may compute a mean and standard deviation of the frame-level activations $f_1, f_2, f_n$ to reduce the frame-level activations $f_1, f_2, f_n$ to a segment vector.

The segment-level layers may include a plurality of hidden layers followed by a softmax output layer. The plurality of hidden layers may be fully connected layers. A speaker embedding (e.g., a speaker embedding vector) may be output from the last hidden layer, among the plurality of layers, and a speaker identification may be output from the softmax output layer.

The speaker embedding extraction model according to an embodiment may be trained using speech signals of a plurality of different languages, to generate language-dependent speaker embedding extraction models. For example, the speaker embedding extraction model may be trained using speech signals of a first language (e.g., English) to generate a first language-based speaker embedding extraction model (e.g., English-based speaker embedding extraction model), and the speaker embedding extraction model may be trained using speech signals of a second language to generate a second language-based speaker embedding extraction model (e.g., Korean-based speaker embedding extraction model). The first language-based speaker embedding extraction model may be used to extract speaker embeddings from speech signals of the first language. The second language-based speaker embedding extraction model may be used to extract speaker embeddings from speech signals of the second language.

FIG. 6 is a diagram illustrating a speaker embedding clustering process according to embodiments.

In an embodiment of the present disclosure, agglomerative hierarchical clustering (AHC) may be applied to cluster speaker embeddings, but the embodiment is not limited thereto. For example, another clustering method, such as a spectral clustering method, may be applied to cluster speaker embeddings.

Firstly, similarity scores or dissimilarity scores may be computed between all pairs of speaker embeddings. For example, as shown in (a) of FIG. 6, dissimilarity scores may be computed between all the pairs of speaker embeddings A, B, C, . . . , I, and a score matrix may be obtained based on the dissimilarity scores. Cosine similarity or probabilistic linear discriminant analysis (PLDA) may be used to compute the dissimilarity scores. When dissimilarity scores are used, the lower the score is, the more similar the pair of speaker embeddings is.

Once the dissimilarity scores are obtained for all the pairs of speaker embeddings, the speaker embeddings are iteratively clustered based on pairwise scores, for example, via a bottom-up clustering method such as an agglomerative hierarchical clustering (AHC) method.

For convenience of explanation, it is assumed that there are four speaker embeddings, A, B, C, and D, in (b1)-(b5) of FIG. 6.

At step 1, dissimilarity scores are computed for all the pairs of speaker embeddings, a pair of A and B, a pair of A and C, a pair of A and D, a pair of B and C, a pair of B and D, and a pair of C and D. The dissimilarity scores may be presented in the form of a score matrix.

At step 2, the pair of speaker embeddings having the lowest dissimilarity score is identified from the score matrix. Referring to (b2) of FIG. 6, the pair of A and B is identified as having the lowest dissimilarity score of 0.2.

At step 3, the pair of speaker embeddings having the lowest dissimilarity score is grouped as the same cluster, and the dissimilarity scores are updated with lower scores of pairs. As shown in (b2) and (b3) of FIG. 6, the pair of speaker embeddings A and B having the lowest dissimilarity score of 0.2 is collapsed into cluster AB. In updating the dissimilarity scores between a pair of AB and C and a pair of AB and D, the dissimilarity score 0.6 between B and C, and the dissimilarity score 0.5 between B and D are selected, among the dissimilarity score 0.7 between A and C, the dissimilarity score 0.8 between A and D, the dissimilarity score 0.6 between C and D, and the dissimilarity score 0.5 between B and D, based on the determination that the dissimilarity score 0.6 between B and C is lower than the dissimilarity score 0.7 between A and C, and the dissimilarity score 0.5 between B and D is lower than the dissimilarity score 0.8 between A and D.

At step 4, the pair of speaker embeddings having the lowest dissimilarity score is identified from the updated score matrix. Referring to (b3) of FIG. 6, the pair of C and D is identified as having the lowest dissimilarity score of 0.3, and C and D are collated into cluster CD.

At step 5, the score matrix is updated as shown in (b4) of FIG. 6, to show the dissimilarity score between the pair of AB and CD.

The clustering is terminated when the number of clusters reaches a preset number of clusters N. For example, when N is set to 2, the clustering stops when C and D are collapsed into cluster CD.

In an embodiment, when N is unknown, the clustering is continued until the lowest dissimilarity score among a plurality of dissimilarity scores reaches the predetermined dissimilarity threshold TH. For example, at step b5, when N is unknown, the dissimilarity score (e.g., 0.5) between cluster AB and cluster CD is compared with the predetermined dissimilarity threshold TH (e.g., 0.4), and the clustering stops if the dissimilarity score becomes greater than or equal to the predetermined dissimilarity threshold TH, as shown in (b5) of FIG. 6. As a result, two clusters AB and CD are obtained as corresponding to two different speakers.

Figure 7:
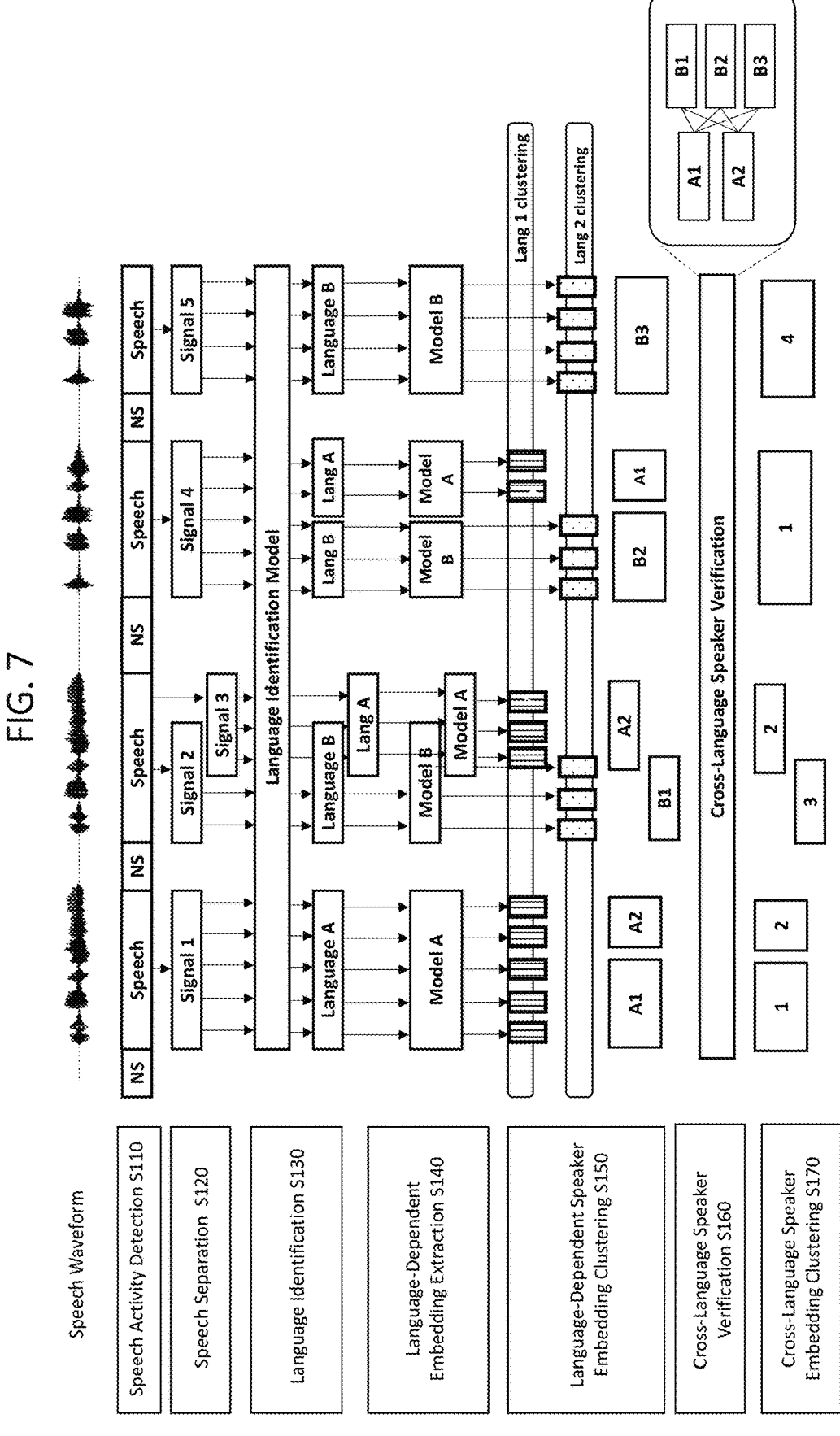
FIG. 7 illustrates an overall speaker diarization process according to embodiments.

FIG. 7 illustrates an overall speaker diarization process according to embodiments.

As shown in FIG. 7, in operation S110, speech activity detection (SAD) is performed on a speech waveform to identify speech segments and non-speech (NS) segments from the speech waveform.

In operation S120, speech separation is performed on the speech segments to separate speech signals in a case in which there is overlapped speech in the speech segments. An overlapped speech detection (OSD) module may determine whether a speech segment includes speech from a single speaker, or overlapped speech from multiple speakers. If the OSD module determines that the speech segment includes speech from the single speaker, operation S120 may be omitted. On the other hand, if the OSD module determines that the speech segment includes overlapped speech from multiple speakers, operation S120 may be performed to separate the overlapped speech. For example, referring to FIG. 7, there is overlapped speech in the second speech activity detection among the four speech activity detections, and two speech signals (i.e., speech signals 2 and 3) are separated from the second speech activity detection. As a result, five signal speech signals (i.e., speech signals 1-5) are obtained from the four speech activity detections in the example of FIG. 7.

In operation S130, a language of each of the speech signals is identified using a language identification model according to an embodiment of the disclosure. The language identification model may be implemented using a temporal convolutional neural network (TCNN).

In identifying languages of the speech signals, the speech signals may be split into short speech segments having a preset length of time (e.g., 1.5 seconds) and the language identification is performed on each of the short speech segments. Referring to FIG. 7, the language of speech signals 1 and 3 is identified as language A (e.g., English), and the language of speech signals 2 and 5 is identified as language B (e.g., Korean). Two different languages, language A and language B may be identified from speech signal 4, by checking the language of each of the short speech segments included in speech signal 4.

In operation S140, speech signals of language A are input to a first speaker embedding extraction model (also referred to as "speaker embedding extraction model A"), and speech signals of language B are input to a second speaker embedding extraction model (also referred to as "speaker embedding extraction model B"). The speaker embedding extraction model A includes one or more neural networks that are trained using sample speech signals of language A, and the speaker embedding extraction model B includes one or more neural networks that are trained using sample speech signals of language B. In an embodiment of the disclosure, the speaker embedding extraction model A and the speaker embedding extraction model B may have the same neural network structure, for example, as shown in FIG. 5, but may be trained using different training data so that the speaker embedding extraction model A is tailored to extract speaker embeddings from speech signals of language A, and the speaker embedding extraction model B is tailored to extract speaker embeddings from speech signals of language B.

Referring to FIG. 7, speech signals 1 and 3, and a second portion of speech signal 4 which are identified as being spoken in language A are input to the speaker embedding extraction model A, and speaker embeddings A are extracted from the speech signals via the speaker embedding extraction model A. Speech signal 2, a first portion of signal 4, and speech signal 5 which are identified as being spoken in language B are input to the speaker embedding extraction model B, and speaker embeddings B are extracted from the speech signals via the speaker embedding extraction model B. Each speech signal 1-5 includes a plurality of speech segments (e.g., 1.5 second speech segments), and the speaker embedding extraction models A and B may extract speaker embeddings A and B from each of the plurality of speech segments. For example, speech signal 1 includes five speech segments, and five speaker embeddings A are extracted from the five speech segments of speech signal 1, using the speaker embedding extraction model A.

In the related art, a single language-based embedding extraction model may be used to process a speech recording regardless of the language of the speech recordings. When multiple languages are used by the same speaker in the speech recording, performance of the single language-based embedding extraction model may be degraded because the single language-based embedding extraction model may recognize different acoustic phonetic sequences of different languages as being directed to different speakers. In contrast, a plurality of language-dependent speaker embedding extraction models according to an embodiment are separately and individually trained using different language signals. Therefore, speaker embeddings are more effectively extracted by processing the different language signals via different speaker embedding extraction models corresponding to the different language signals.

In operation S150, language-dependent clustering is performed on speaker embeddings A and speaker embeddings B separately. Specifically, speaker embeddings A extracted by the speaker embedding extraction model A are clustered based on a vector similarity between a plurality of pairs of speaker embeddings A, to determine speech segments that belong to the same speaker identity. In a separate process, the speaker embeddings B extracted by the speaker embedding extraction model B are clustered based on a vector similarity between a plurality of pairs of speaker embeddings B, to determine speech segments that belong to the same speaker identity. An agglomerative hierarchical clustering (AHC) method may be used to cluster the speaker embeddings A and the speaker embeddings B in a manner as described in FIG. 6.

Referring to FIG. 7, the speaker embeddings A output from the speaker embedding extraction model A are grouped into two speaker clusters A1 and A2 that belong to two different speaker identities. The speaker embeddings B output from the speaker embedding extraction model B are grouped into three speaker clusters B1, B2, and B3 that belong to three different speaker identities.

In operation S160, speaker verification is performed across language-dependent speaker clusters to determine if there are speeches spoken by the same speaker in the different language speaker clusters.

For example, when there are five language-dependent speaker clusters, including first language-based speaker clusters, A1 and A2, and second language-based speaker clusters, B1, B2, and B3, vector dissimilarities between each of the first language-based speaker clusters, A1 and A2, and each of the second language-based speaker clusters, B1, B2, and B are computed, as follows:

A first vector dissimilarity between the first language-based speaker cluster A1 and the second language-based speaker cluster B1;

A second vector dissimilarity between the first language-based speaker cluster A1 and the second language-based speaker cluster B2;

A third vector dissimilarity between the first language-based speaker cluster A1 and the second language-based speaker cluster B3;

A fourth vector dissimilarity between the first language-based speaker cluster A2 and the second language-based speaker cluster B1;

A fifth vector dissimilarity between the first language-based speaker cluster A2 and the second language-based speaker cluster B2; and A sixth vector dissimilarity between the first language-based speaker cluster A2 and the second language-based speaker cluster B3.

When the number of speakers is not known, each of the first to the sixth vector dissimilarities may be compared with a predetermined dissimilarity threshold, and only the clusters having a vector dissimilarity that is less than the predetermined dissimilarity threshold is combined as the same cluster. For example, when the predetermined threshold is 0.4, and the first to the sixth vector dissimilarities are 0.2, 0.4, 0.6, 0.8, 0.9, and 0.7, respectively, only the first language-based speaker cluster A1 and the second language-based speaker cluster B1 (which have the vector dissimilarity of 0.2 less than the predetermined dissimilarity threshold of 0.4) are clustered as the same cluster (e.g., cluster 1), so that the total number of clusters become four (4).

When the number of speakers in the audio stream is known, a clustering algorithm is applied to identify a pair of speaker clusters having a dissimilarity score that is less than the predetermined dissimilarity threshold, and to combine them as the same cluster, until the total number of clusters becomes the number of speakers. For example, after combining the first language-based speaker cluster A1 and the second language-based speaker cluster B1 as the same cluster, the total number of clusters is compared with the number of speakers. If the total number of clusters (e.g., 4) becomes equal to the number of speakers, operation S160 stops. If not, the predetermined dissimilarity threshold is increased, for example, from 0.4 to 0.5, and operation S160 is performed based on the increased dissimilarity threshold of 0.5, to combine the first language-based speaker cluster A1 and the second language-based speaker cluster B2 (which have the vector dissimilarity of 0.4 less that the increased dissimilarity threshold of 0.5) as the same cluster. If the total number of clusters (e.g., 3) becomes equal to the number of speakers, operation S160 stops. If not, the predetermined dissimilarity threshold is increased again, for example, from 0.5 to 0.6, and operation S160 is iteratively performed.

In operation S170, the language-dependent speaker clusters are merged based on the speaker identification assigned to each of the language-dependent speaker clusters. For example, the first language-based speaker cluster A1 and the second language-based speaker cluster B2 are identified as belonging to the same speaker identity based on the vector dissimilarity between the first language-based speaker cluster A1 and the second language-based speaker cluster B2 being less than the predetermined dissimilarity threshold, and the same speaker identity no. 1 is assigned to the speaker cluster A1 and B2. As a result, the five speaker clusters A1, A2, B1, B2, and B3 are merged into four final clusters 1-4, wherein the same speaker identity no. 1 is assigned to speaker clusters A1 and B2, and different speaker identity nos. 2-4 are given to the rest of the speaker clusters A2, B1, and B3, respectively.

Figure 8:
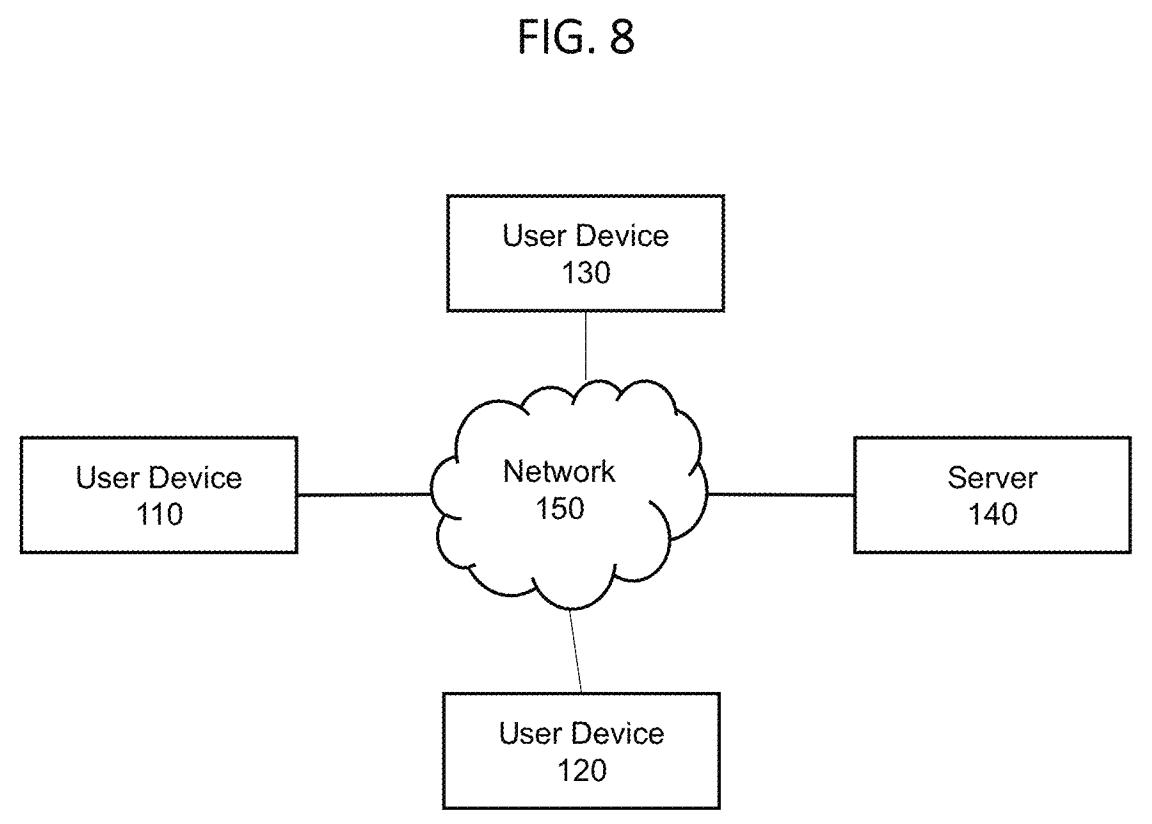

FIG. 8 is a diagram of devices for performing speaker diarization according to embodiments of the present disclosure. FIG. 8 includes user devices 110, 120, 130, a server 140, and a network 150. The user devices 110, 120, 130 and the server 140 may interconnect via wired connections, wireless connections, or a combination of wired and wireless connections.

Each of the user devices 110, 120, 130 includes one or more devices configured to receive and process an acoustic signal. For example, each of the user devices 110, 120, 130 may include a computing device (e.g., a desktop computer, a laptop computer, a tablet computer, a handheld computer, a smart speaker, a server, etc.), a mobile phone (e.g., a smart phone, a radiotelephone, etc.), an audio recorder, a wearable device (e.g., a pair of smart glasses or a smart watch), or a similar device. Each of the user devices 110, 120, 130 may perform all or some of operations S110-S170 described with reference to FIGS. 1-7. For example, the user devices 110, 120, 130 may include a microphone, a speaker, and a processor to allow users to conduct an audio conference or a video conference with each other via the server 140, and may perform operations S110-S170 in processing an acoustic signal that is received during the audio conference or the video conference. The user devices 110, 120, 130 may perform operations S110-S170 to analyze an audio recording (e.g., a voicemail) and to provide a transcript of the audio recording.

The server 140 may store language-dependent speaker embedding extraction models according to embodiments. For example, the server 140 may be a server, a computing device, or the like. The server 140 may receive an audio signal from an external device (e.g., the user devices 110, 120, 130 or another external device), train a neural network for extracting speaker embeddings from the audio signal, and provide the trained neural network to the user devices 110, 120, 130 to permit the user devices 110, 120, 130 to extract speaker embeddings using the neural network. Further, the server 140 may perform all or some of operations S110-S170 described in FIGS. 1-7.

The network 150 includes one or more wired and/or wireless networks. For example, network 150 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) may perform one or more functions described as being performed by another set of devices.

Figure 9:
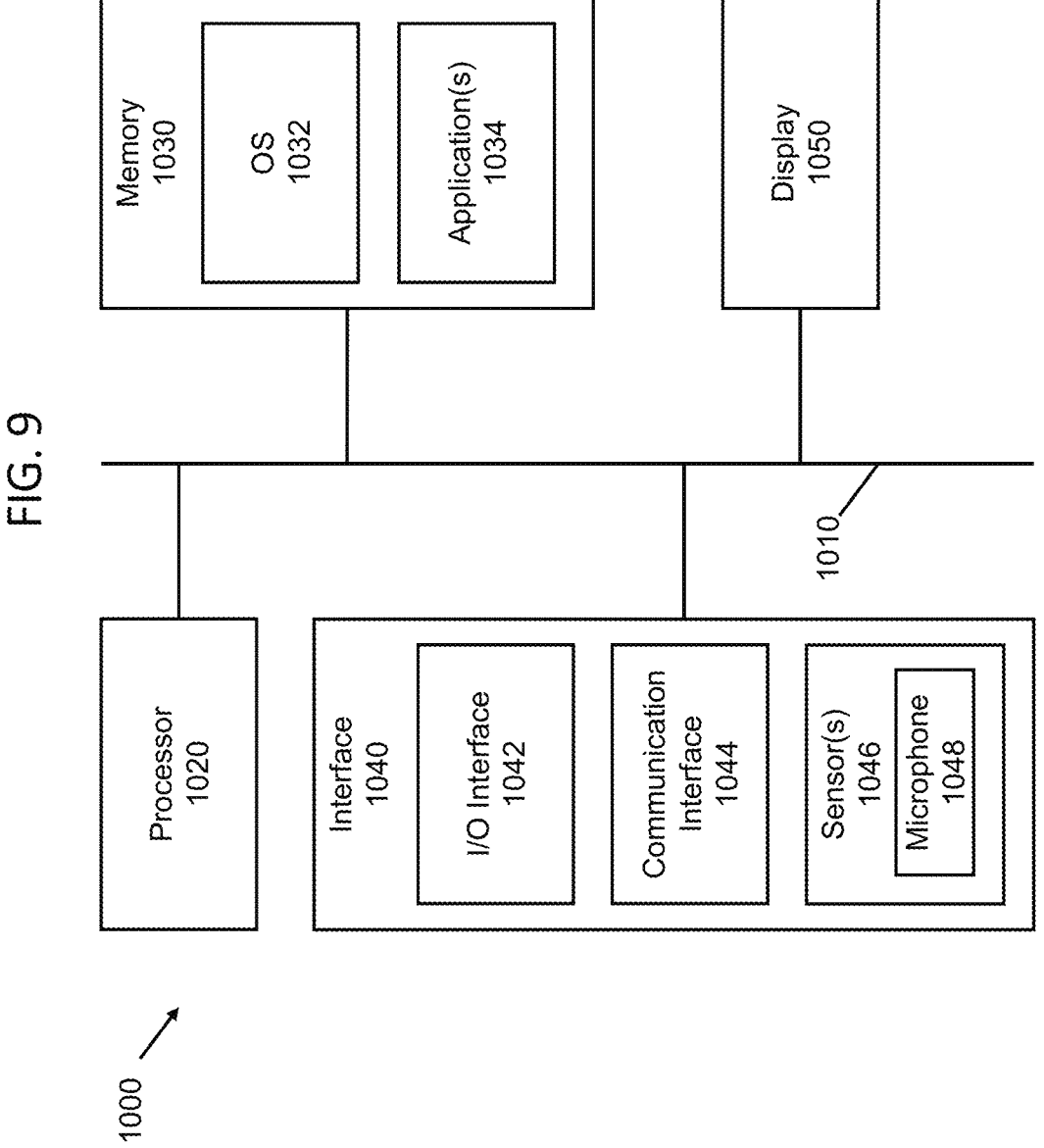
FIG. 9 is a diagram of components of one or more devices of FIG. 7 according to embodiments.

FIG. 9 is a diagram of components of one or more devices of FIG. 8 according to an embodiment. An electronic device 1000 may correspond to the user device 110, 120, or 130, and/or the server 140.

FIG. 9 is for illustration only, and other embodiments of the electronic device 1000 could be used without departing from the scope of this disclosure.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. The processor 1020 executes one or more programs stored in the memory 1030, to perform operations S110-S170 illustrated in FIGS. 1-7 according to embodiments of the present disclosure.

The memory 1030 may include a volatile and/or non-volatile memory. The memory 1030 stores information, such as one or more of commands, data, programs (one or more instructions), a speech separation model shown in FIGS. 3A and 3B, neural networks (e.g., the neural networks shown in FIGS. 4 and 5), and applications 1034, etc., which are related to at least one other component of the electronic device 1000 and for driving and controlling the electronic device 1000. For example, commands and/or data may formulate an operating system (OS) 1332. Information stored in the memory 1030 may be executed by the processor 1020.

The applications 1034 include the above-discussed embodiments. These functions can be performed by a single application or by multiple applications that each carry out one or more of these functions.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the device 1000.

The sensors 1046 can meter a physical quantity or detect an activation state of the electronic device 1000 and convert metered or detected information into an electrical signal. For example, the sensors 1046 can include one or more microphones 1048 or other imaging sensors for capturing images of scenes. The sensors 1046 can also include any one or any combination of a microphone, a keyboard, a mouse, and one or more buttons for touch input. In addition, the sensors 1046 can include a control circuit for controlling at least one of the sensors included herein. Any of these sensors 1046 can be located within or coupled to the device 1000. The sensors 1046 may be used to detect touch input, gesture input, and hovering input, using an electronic pen or a body portion of a user, etc.

The communication interface 1044, for example, is able to set up communication between the electronic device 1000 and an external electronic device. The communication interface 1044 can be a wired or wireless transceiver or any other component for transmitting and receiving signals.

FIG. 10 is a flowchart illustrating a method of performing speaker diarization according to embodiments.

In operation S1010, the processor 1020 may detect speech activities from an audio stream, for example, based on a Gaussian mixture model, a hidden Markov model, or a multi-layer perceptron model.

In operation S1020, the processor 1020 may separate speech signals from the audio stream if the speech signals are overlapped with each other in a time domain. An overlapped speech detection (OSD) module may determine whether a speech segment includes speech from a single speaker, or overlapped speech from multiple speakers. If the OSD module determines that the speech segment includes speech from the single speaker, operation S1020 may be omitted. On the other hand, if the OSD module determines that the speech segment includes overlapped speech from multiple speakers, operation S1020 may be performed to separate the overlapped speech. For example, the processor 1020 may execute the deep learning-based speech separation model shown in FIG. 2, to separate overlapped speech signals.

In operation S1030, the processor 1020 may identify a language corresponding to each of the speech signals. For example, the processor 1020 may use a neural network-based language identification model shown in FIG. 4 to identify the language of each speech signal or each speech segment.

In operation S1040, the processor 1020 may extract speaker embeddings from the speech signals by mapping the speech signals to corresponding language-dependent speaker embedding extraction models, based on a language identification of each of the speech signals. When the speech signal is identified as being of a first language, a first language-based speaker embedding extraction model is used to extract speaker embeddings from the speech signal of the first language. When the speech signal is identified as being of a second language, a second language-based speaker embedding extraction model is used to extract speaker embeddings from the speech signal of the second language. The first language-based speaker embedding extraction model and the second language-based speaker embedding extraction model may have the same neural network structure, for example, as shown in FIG. 5, but may be trained using different language signals. The first language-based speaker embedding extraction model may be trained using speech signals of the first language, and the second language-based speaker embedding extraction model may be trained using speech signals of the second language.

In operation S1050, the processor 1020 may cluster the extracted speaker embeddings per language, as language-dependent speaker clusters, to determine speech segments that belong to the same speaker identities per language. The processor 1020 may use a hierarchical clustering algorithm as shown in FIG. 6 to obtain the language-dependent speaker clusters.

In operation S1060, the processor 1020 may perform a cross-language speaker verification on the language-dependent speaker clusters to determine if there is the same speaker in the language-dependent speaker clusters of different languages. For example, the processor 1020 may calculate vector similarities or vector dissimilarities between a plurality of pairs of first language-based speaker clusters and second language-based speaker clusters to identify the same speaker from the different language-based speaker clusters. The processor 1020 may assign final speaker IDs to the language-dependent speaker clusters based on the vector similarities or the vector dissimilarities between the plurality of pairs of the first language-based speaker clusters and the second language-based speaker clusters.

In operation S1070, the processor 1020 may combine the language-dependent speaker clusters based on the final speaker IDs. The language-dependent speaker clusters having the same final speaker ID may be collapsed into a single cluster.

FIG. 11 is a flowchart illustrating a method of performing language-dependent speaker clustering on the speaker embeddings according to embodiments. Operation S1050 of FIG. 10 may include operations S1051-S1054 as shown in FIG. 11.

In operation S1051, the processor 1020 may calculate dissimilarity scores between all pairs of speaker embedding vectors.

In operation S1052, the processor 1020 may identify a pair of speaker embedding vectors having the lowest dissimilarity score, among the dissimilarity scores calculated in operation S1051.

In operation S1053, the processor 1020 may cluster the pair of speaker embedding vectors having the lowest dissimilarity score as the same cluster if the lowest dissimilarity score is less than a predetermined dissimilarity threshold.

In operation S1054, the processor 1020 may iteratively perform operations S1051-S1053 until the lowest dissimilarity score reaches a predetermined dissimilarity threshold. When the processor 1020 performs clustering per language, the processor 1020 may not have information of the number of speakers per language, and therefore may use the dissimilarity threshold as a reference point for stopping the clustering operation. If the processor 1020 has information of the number of total speakers in an audio stream and if the total number of language-dependent speaker clusters is less than the number of total speakers, the dissimilarity threshold is decreased and operations S1051-S1053 are repeated until the total number of language-dependent speaker clusters reaches the number of total speakers. However, if the processor 1020 has information of the number of speakers per language, the processor 1020 may iteratively perform the language-dependent speaker clustering per language until the number of clusters per language becomes the number of total speakers per language.

Figure 12:
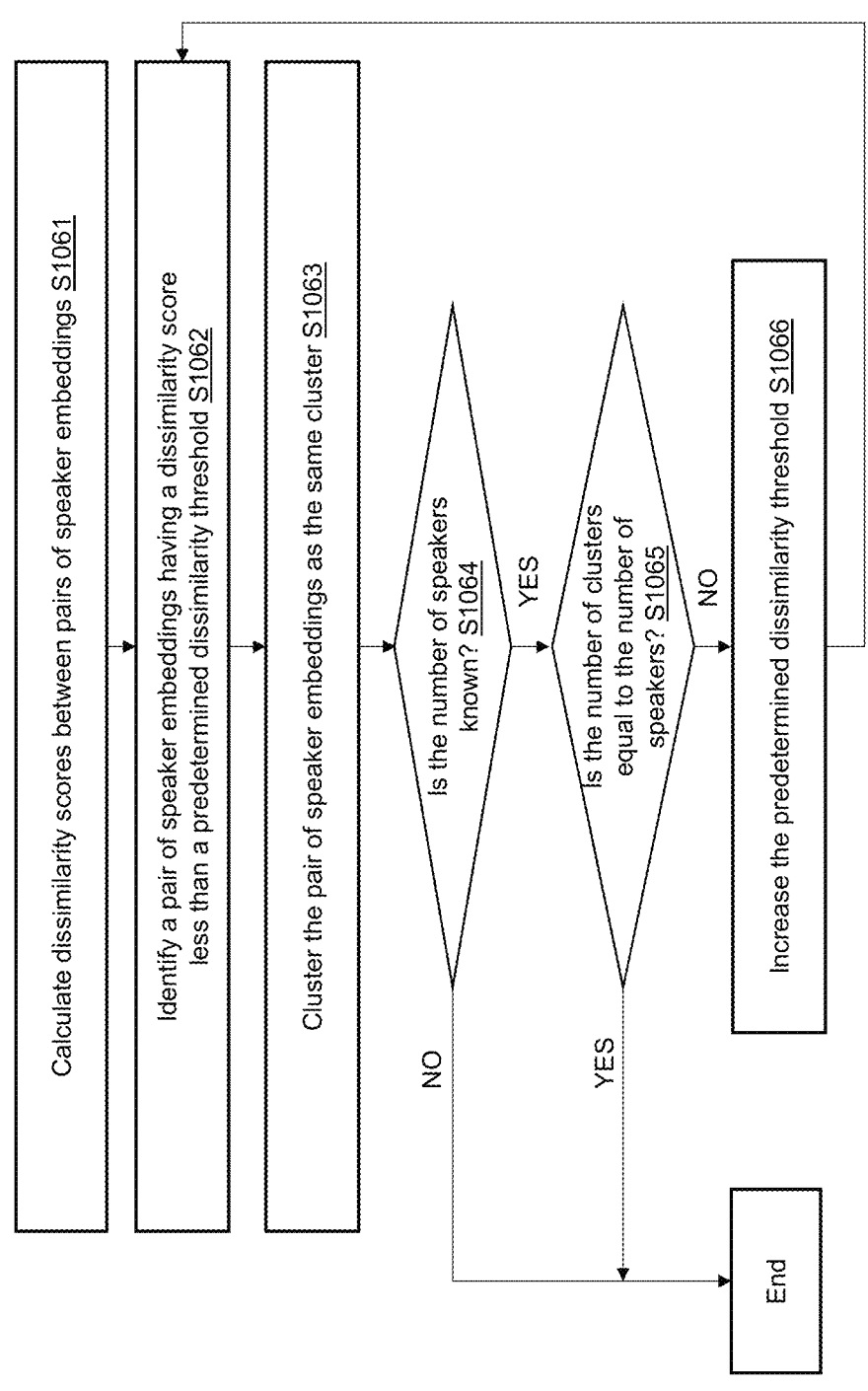

FIG. 12 is a flowchart illustrating a method of performing speaker verification across language-dependent speaker clusters according to embodiments. Operation S1060 of FIG. 10 may include operations S1061-S1066 as shown in FIG. 12.

In operation S1061, the processor 1020 may calculate dissimilarity scores between a plurality of pairs of speaker embedding vectors of different languages.

In operations S1062 and S1063, the processor 1020 may identify a pair of speaker embedding vectors of the different languages, which has a dissimilarity score that is less than a predetermined dissimilarity threshold, and may cluster the identified pair of speaker embedding vectors as the same cluster.

In operation S1064, the processor 1020 may determine whether the number of speakers is known, and if so, may proceed to operation S1065 to determine whether the number of clusters is equal to the number of speakers. If the number of clusters is the same as the number of speakers, the cross-language speaker verification process is terminated, and otherwise, the processor 1020 may increase the predetermined dissimilarity threshold in operation S1066, to iteratively perform the cross-language speaker verification process based on the increased dissimilarity threshold.

Figure 14:
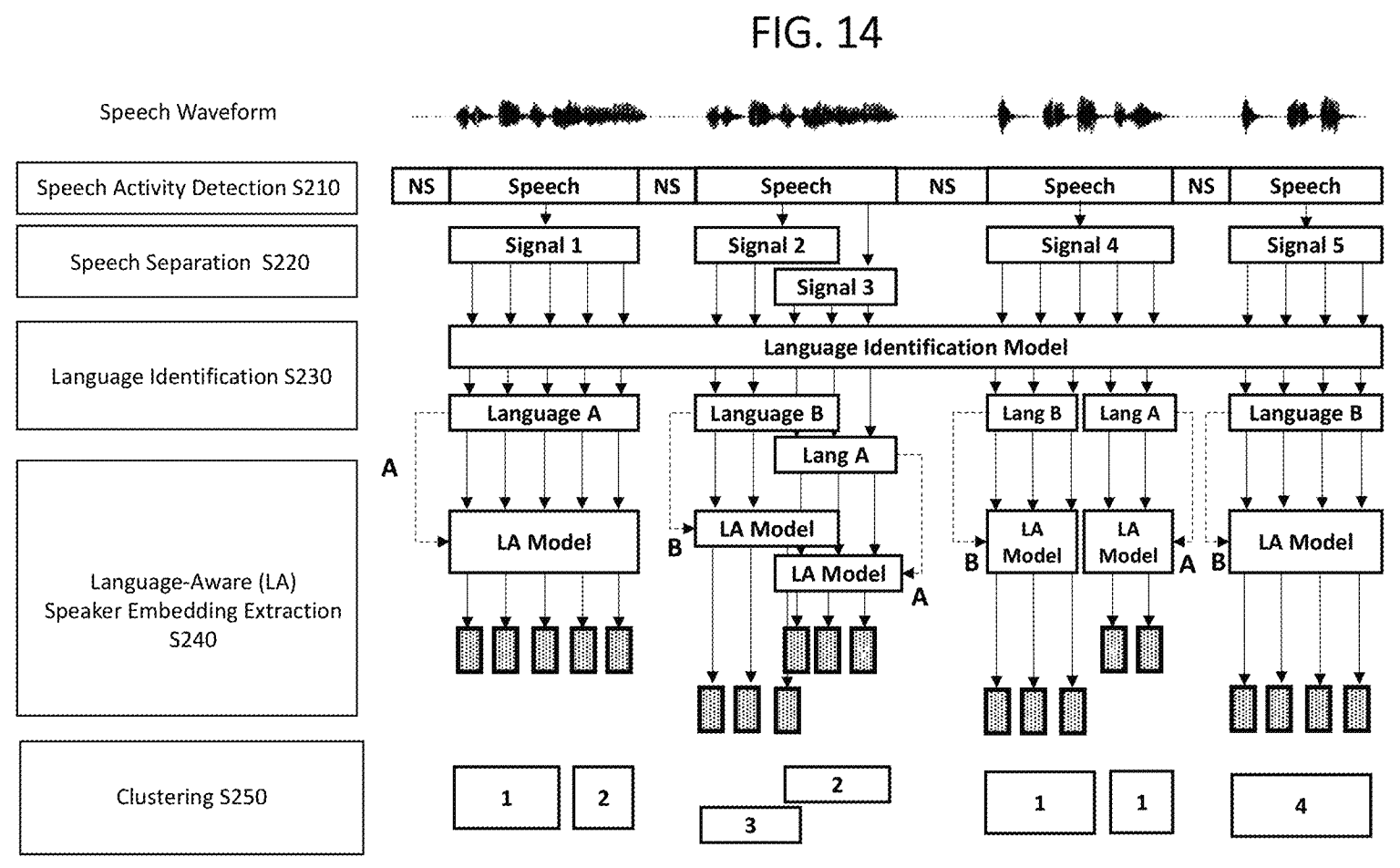
Figure 15:
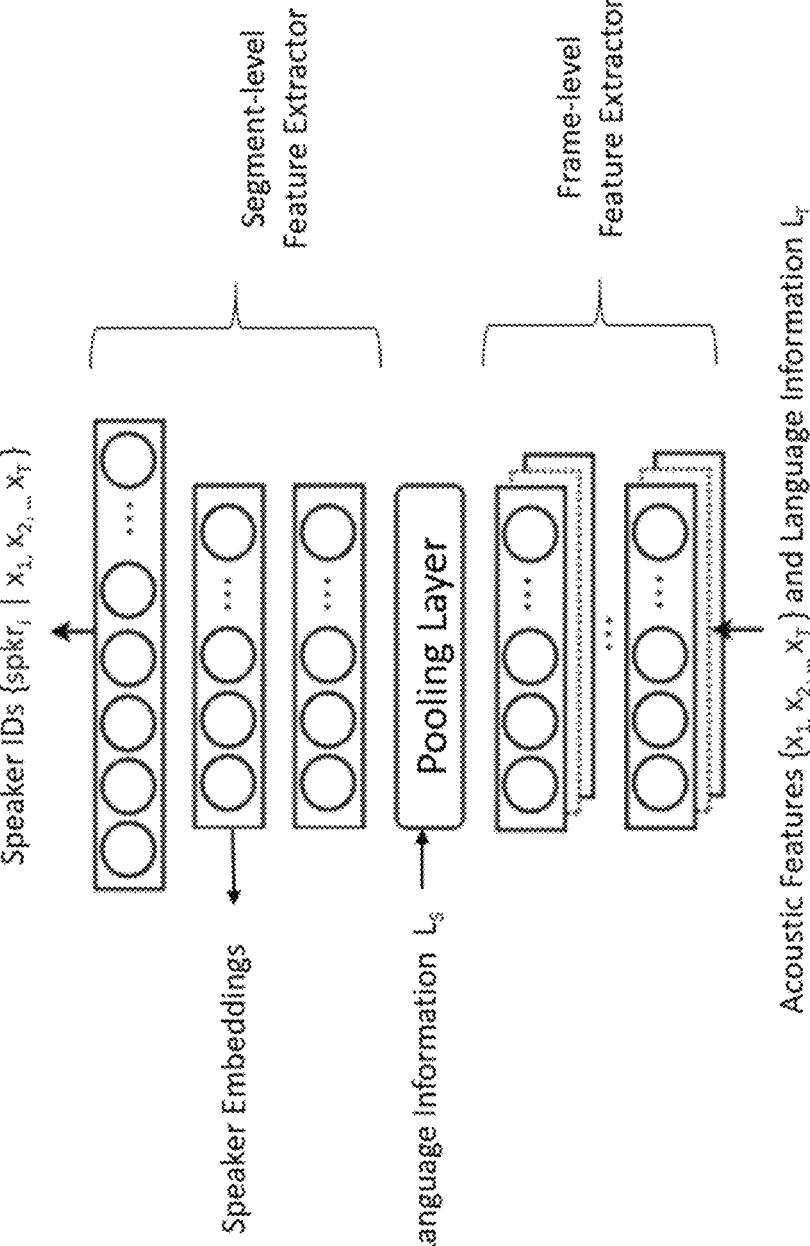
FIG. 15 is a diagram illustrating a speaker embedding extraction process according to other embodiments.

FIGS. 13 and 14 illustrate a method of performing speaker diarization based on language identification, and FIG. 15 illustrates a language-aware speaker embedding extraction model, according to other embodiments of the disclosure.

A method 200 of performing speaker diarization includes operation S210 of detecting speech activities from an audio stream, operation S220 of separating overlapped speech signals, operation S230 of identifying a language corresponding to each of the speech signals, operation S240 of extracting speaker embeddings from the speech signals using a language-aware speaker embedding extracting model, operation S250 of clustering the speaker embeddings. Operation S220 may be omitted if there is no overlapped speech in a speech segment. Operations S210-S250 illustrated in FIG. 13 may be performed by at least one processor included in any type of electronic device, for example, a smartphone, a laptop computer, a personal computer (PC), a smart television, a server, and the like. For example, some or all of operations S210-S250 may be performed by the user device 110 or the server 140 shown in FIG. 8.

Operations S210-S230 may be substantially the same as operations S110-S130, and therefore redundant descriptions will be omitted.

Referring to FIG. 14, in operation S240, speech signals 1-5 are processed using a language-aware speaker embedding extraction model, to extract speaker embeddings from speech signals 1-5. The language-aware speaker embedding extraction model may receive a language identification of an input speech signal, in addition to the input speech signal, to extract speaker embeddings from the input speech signal. For example, the language-aware speaker embedding extraction model receives, as input, speech signal 1 and language identification A of speech signal 1, and extracts speaker embeddings from speech signal 1 based on language identification A. Also, the language-aware speaker embedding extraction model receives, as input, speech signal 2 and language identification B of speech signal 2, and extracts speaker embeddings from speech signal 2 based on language identification B.

Referring to FIG. 15, the language-aware speaker embedding extraction model includes one or more neural networks. For example, the language-aware speaker embedding extraction includes frame-level layers, a statistics pooling layer, and segment-level layers.

The frame-level feature layers receive, as input, frame-level acoustic features (e.g., features extracted from 10 ms time windowed frames), for example such as Mel-filter bank energies, Mel-frequency cepstral coefficients, and language information of an input speech signal. The frame-level acoustic features are represented as $x_1, x_2, \ldots x_T$ (e.g., 15 dimensional acoustic feature vectors), wherein $T$ is the number of frames, and the language information is represented as $L_T$ (e.g., 1 dimensional language feature vector). For example, when the length of the input speech signal is 1.5 seconds, the speech signal is split into 150 frames, each having the length of 10 ms. The acoustic features extracted from 150 frames, a 16×150 matrix representing $\{[x_1, L_T], [x_2, L_T] \ldots , [x_{150}, L_T]\}$, where $[x_t, L_T]$ represents an augmented vector of $x_t$ and $L_T$, may be input to an input layer of the frame-level feature layers, as the frame-level acoustic features.

The frame-level feature layers may be constituted with a deep neural network such as a convolutional neural network or time-delayed neural network, and may output frame-level activations, $f_1, f_2, \ldots f_n$.

The statistics pooling layer may aggregate the frame-level activations $f_2, f_n$ over a segment (e.g., 1.5 seconds). For example, the statistics pooling layer may compute a mean and standard deviation of the frame-level activations $f_1, f_2, f_n$ and may reduce them to a segment vector. The language information $L_s$ of the input signal may be appended to the segment vector. The language information $L_T$ and $L_s$ may contain the same information, but are input to the different layers, the input layer of the frame-level feature layers, and the plurality of segmentation-level layers.

The segment-level layers may include a plurality of hidden layers followed by a softmax output layer. The plurality of hidden layers may be fully connected layers. A speaker embedding (e.g., a speaker embedding vector) may be output from the last hidden layer, among the plurality of layers, and a speaker identification may be output from the softmax output layer.

The language-aware speaker embedding extraction model according to an embodiment may be trained using speech signals of a plurality of different languages, and language information of the speech signals, to extract speaker embeddings regardless of the languages of the speech signals.

Referring back to FIG. 13, in operation S250, the speaker embeddings are iteratively clustered based on vector similarities or vector dissimilarities between all pairs of the speaker embeddings. For example, a bottom-up clustering method such as an agglomerative hierarchical clustering (AHC) method may be used to cluster the speaker embeddings. Referring to FIG. 14, the speaker embeddings are grouped into four clusters 1-4 that belong to four different speakers, through the iterative clustering process.

FIGS. 16 and 17 are flowcharts illustrating a method of performing speaker diarization according to other embodiments.

Operations S2010-S2030 may be substantially the same as operations S1010-S1030 and therefore redundant descriptions will be omitted.

In operation S2040, the processor 1020 may extract speaker embeddings from speech signals using a language-aware speaker embedding extraction model. The processor 1020 may feed, as input, a speech signal and a language identification of the speech signal to the language-aware speaker embedding extraction model, to obtain speaker embeddings as an output of the language-aware speaker embedding extraction model. The language-aware speaker embedding extraction model may include frame-level layers, a statistics pooling layer, and segment-level layers as shown in FIG. 15. Referring to FIG. 15, the speech signal is input to the frame-level layers, and the language identification may be input to the frame-level layers and also to the segment-level layers. The speaker embeddings may be output from the last hidden layer of the segment-level layers.

Referring back to FIG. 16, in operation S2050, the processor 1020 may iteratively cluster the speaker embeddings based on vector similarities or vector dissimilarities between all pairs of the speaker embeddings to identify the speaker embeddings that correspond to the same speaker identifies. For example, the processor 1020 may use an agglomerative hierarchical clustering (AHC) method to cluster the speaker embeddings.

Operation S2050 of FIG. 16 may include operations S2051-S2054 as shown in FIG. 17. Operations S2051-S2053 may be substantially the same as operations S1051-S1053 and therefore redundant descriptions will be omitted.

In operation S2054, the processor 1020 may iteratively perform operations S2051-S2053 until the lowest dissimilarity score reaches a predetermined dissimilarity threshold, or until the number of clusters becomes a present number which represents the number of speakers in the audio signal. When the number of speakers is known, or the processor 1020 is capable of determining the number of speakers from the audio signal, the processor 1020 may stop clustering when the number of clusters becomes the number of speakers. The processor 1020 may otherwise stop clustering when the lowest dissimilarity score reaches the predetermined dissimilarity threshold.

Operations S2010-S2054 illustrated in FIGS. 16 and 17 may be performed by at least one processor included in any type of electronic device, for example, a smartphone, a laptop computer, a personal computer (PC), a smart television, a server, and the like. For example, some or all of S2010-S2054 may be performed by the user device 110 or the server 140 shown in FIG. 8.

FIG. 18 are views illustrating examples of an electronic apparatus performing speaker diarization according to various embodiments of the disclosure.

As shown in FIG. 18, the electronic apparatus may be implemented as a smartphone 1001, a tablet personal computer (PC) 1002, a laptop 1003, or a server 1004.

The electronic apparatus may receive an audio signal from an external device, or detect the audio signal using a microphone included in or connected to the electronic apparatus. In an embodiment, the electronic apparatus may support an audio or video conference, and may receive or detect an audio signal via an audio or video conference application of the electronic apparatus. The audio signal may include a meeting recording or a voicemail. The electronic apparatus may identify one or more speakers of speech segments in the audio signal, through operations S110-S170 or operations S210-S250. The electronic apparatus may perform signal processing on speech clusters corresponding to different speakers separately or individually to effectively reduce noise and improve signal quality for each of the speech clusters.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to the electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. An apparatus for processing speech data, the apparatus comprising:

a memory storing instructions; and a processor configured to execute the instructions to:

separate speech signals from an input speech;

identify a language of each of the speech signals that are separated from the input speech;

extract speaker embeddings from the speech signals based on the language of each of the speech signals, using a plurality of different speech embedding extraction models by inputting the speech signals in different languages to the plurality of different speech embedding extraction models, wherein at least one neural network of the plurality of different speech embedding extraction models is trained with the different languages;

cluster the speaker embeddings for each of the different languages separately, to obtain language-dependent embedding clusters for each of the different languages;

combine the language-dependent embedding clusters based on a vector dissimilarity between the language-dependent clusters, to obtain cross-language embedding clusters; and identify a speaker of each of the speech signals, including a same speaker in the different languages, based on the cross-language embedding clusters, wherein the different languages comprise a first language and a second language, and the plurality of different speech embedding extraction models comprise a first neural network model trained based on the first language and a second neural network model trained based on the second language, and the processor is further configured to execute the instructions to:

obtain the speaker embeddings corresponding to the first language, and the speaker embeddings corresponding to the second language, from the first neural network model and the second neural network model, respectively;

iteratively cluster the speaker embeddings corresponding to the first language, and the speaker embeddings corresponding to the second language, separately, to obtain first-language clusters and second-language clusters, respectively; and combine the first-language clusters and the second-language clusters based on the vector dissimilarity between a plurality of pairs of the first-language clusters and the second-language clusters, to obtain the cross-language embedding clusters.

2. The apparatus of claim 1, wherein the processor is further configured to execute the instructions to:

identify the speaker of each of the speech signals based on a vector dissimilarity between a plurality of pairs of the speaker embeddings until the vector dissimilarity becomes a predetermined threshold or a number of clusters becomes a predetermined number.

3. The apparatus of claim 1, wherein each of the plurality of different speech embedding extraction models comprises:

a plurality of frame-level layers configured to process the speech signals at a frame-level, to provide frame-level representations of the speech signals;

a pooling layer configured to aggregate the frame-level representations over a segment, based on a deviation of the frame-level representations;

a plurality of segment-level layers configured to process the frame-level representations at a segmentation level to provide segmentation-level representations of the speech signals and the speaker embeddings: and an output layer configured to output a speaker identification of each of the segmentation-level representations of the speech signals.

4. The apparatus of claim 3, wherein the plurality of frame-level layers form a convolutional neural network or a time-delayed neural network.

5. The apparatus of claim 3, wherein the speaker embeddings are output from a last hidden layer of the plurality of segment-level layers that immediately precedes the output layer.

6. The apparatus of claim 3, wherein the output layer uses a softmax activation function.

7. The apparatus of claim 1, wherein the processor is further configured to execute the instructions to:

extract the speaker embeddings from the speech signals, using the at least one neural network that is further configured to receive language information corresponding to the speaker embedding.

8. The apparatus of claim 1, wherein the processor is further configured to execute the instructions to:

while extracting the speaker embeddings from the speech signals, input information of the first language to the at least one neural network when the speech signals in the first language are input to the at least one neural network, and input information of the second language to the at least one neural network when the speech signals in the second language are input to the at least one neural network.

9. The apparatus of claim 8, wherein the at least one neural network comprises:

a plurality of frame-level layers configured to process the speech signals at a frame-level, to provide frame-level representations of the speech signals;

a pooling layer configured to aggregate the frame-level representations over a segment, based on a deviation of the frame-level representations;

a plurality of segment-level layers configured to process the frame-level representations at a segmentation level to provide segmentation-level representations of the speech signals and the speaker embeddings; and

25 an output layer configured to output a speaker identification of each of the segmentation-level representations of the speech signals, wherein the language information is input to one of the plurality of frame-level layers, and to the plurality of segment-level layers.

10. A method of processing speech data, the method comprising:

separating speech signals from an input speech;

identifying a language of each of the speech signals that are separated from the input speech;

extracting speaker embeddings from the speech signals based on the language of each of the speech signals, using a plurality of different speech embedding extraction models by inputting the speech signals in different languages to the plurality of different speech embedding extraction models, wherein at least one neural network of the plurality of different speech embedding extraction models is trained with the different languages;

clustering the speaker embeddings for each of the different languages separately, to obtain language-dependent embedding clusters for each of the different languages;

combining the language-dependent embedding clusters based on a vector dissimilarity between the language-dependent clusters, to obtain cross-language embedding clusters; and identifying a speaker of each of the speech signals, including a same speaker in the different languages, based on the cross-language embedding clusters, wherein the different languages comprise a first language and a second language, and the plurality of different speech embedding extraction models comprise a first neural network model trained based on the first language and a second neural network model trained based on the second language, and the extracting of the speaker embeddings comprises:

obtaining the speaker embeddings corresponding to the first language, and the speaker embeddings corresponding to the second language, from the first neural network model and the second neural network model, respectively;

iteratively clustering the speaker embeddings corresponding to the first language, and the speaker embeddings corresponding to the second language, separately, to obtain first-language clusters and second-language clusters, respectively; and combining the first-language clusters and the second-language clusters based on the vector dissimilarity between a plurality of pairs of the first-language clusters and the second-language clusters, to obtain the cross-language embedding clusters.

11. The method of claim 10, wherein the identifying the speaker of each of the speech signals comprises:

identifying the speaker of each of the speech signals by iteratively clustering the speaker embeddings based on a vector dissimilarity between a plurality of pairs of the speaker embeddings until the vector dissimilarity becomes a predetermined threshold or a number of clusters becomes a predetermined number.

12. The method of claim 10, wherein the extracting the speaker embeddings comprises:

obtaining frame-level representations from the speech signals at a frame-level;

aggregating the frame-level representations over a segment, based on a deviation of the frame-level representations;

26 processing the aggregated frame-level representations at a segmentation level to provide segmentation-level representations of the speech signals and the speaker embeddings; and outputting the speaker embeddings, and a speaker identification of each of the segmentation-level representations of the speech signals.

13. The method of claim 10, wherein the extracting the speaker embeddings comprises:

extracting the speaker embeddings from the speech signals, using the at least one neural network that is further configured to receive language information corresponding to the speaker embedding.

14. The method of claim 10, wherein the at least one neural network comprises a plurality of frame-level layers, a pooling layer, a plurality of segment-level layers, and an output layer, and wherein the extracting the speaker embeddings comprises:

inputting information of the identified language to one of the plurality of frame-level layers, and to the plurality of segment-level layers; and obtaining the speaker embeddings from a last hidden layer of the plurality of segment-level layers that immediately precedes the output layer.

15. The method of claim 10, wherein the extracting the speaker embeddings comprises:

while extracting the speaker embeddings from the speech signals, inputting information of the first language to the at least one neural network when the speech signals in the first language are input to the at least one neural network, and inputting information of the second language to the at least one neural network when the speech signals in the second language are input to the at least one neural network.

16. The method of claim 10, wherein the identifying the speaker of each of the speech signals comprises:

performing language-dependent speaker clustering on the speaker embeddings of multiple languages to cluster the speaker embeddings per language as the language-dependent clusters;

performing cross-language speaker clustering on the language-dependent clusters to identify the speaker in the language-dependent clusters of the multiple languages;

merging the language-dependent clusters of the multiple languages that belong to the same speaker, to obtain final speaker clusters; and identifying the final speaker clusters as final speaker identities of the speech signals.

17. A non-transitory computer-readable storage medium storing a program that is executable by a computer to perform a method of processing speech data, the method comprising:

separating speech signals from an input speech;

identifying a language of each of the speech signals that are separated from the input speech;

extracting speaker embeddings from the speech signals based on the language of each of the speech signals, using a plurality of different speech embedding extraction models by inputting the speech signals in different languages to the plurality of different speech embedding extraction models, wherein at least one neural network of the plurality of different speech embedding extraction models is trained with the different languages;

clustering the speaker embeddings for each of the different languages separately, to obtain language-dependent embedding clusters for each of the different languages;

combining the language-dependent embedding clusters based on a vector dissimilarity between the language-dependent clusters, to obtain cross-language embedding clusters; and identifying a speaker of each of the speech signals, including a same speaker in the different languages, based on the cross-language embedding clusters, wherein the different languages comprise a first language and a second language, and the plurality of different speech embedding extraction models comprise a first neural network model trained based on the first language and a second neural network model trained based on the second language, and the extracting of the speaker embeddings comprises:

obtaining the speaker embeddings corresponding to the first language, and the speaker embeddings corresponding to the second language, from the first neural network model and the second neural network model, respectively;

iteratively clustering the speaker embeddings corresponding to the first language, and the speaker embeddings corresponding to the second language, separately, to obtain first-language clusters and second-language clusters, respectively; and combining the first-language clusters and the second-language clusters based on the vector dissimilarity between a plurality of pairs of the first-language clusters and the second-language clusters, to obtain the cross-language embedding clusters.

* * * * *